(12) United States Patent
Ito

(10) Patent No.: US 11,175,406 B2
(45) Date of Patent: Nov. 16, 2021

(54) RANGE IMAGING SYSTEM AND SOLID-STATE IMAGING DEVICE

(71) Applicant: Panasonic Intellectual Property Management Co., Ltd., Osaka (JP)

(72) Inventor: Junji Ito, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 353 days.

(21) Appl. No.: 16/136,004

(22) Filed: Sep. 19, 2018

(65) Prior Publication Data

US 2019/0033452 A1 Jan. 31, 2019

Related U.S. Application Data

(63) Continuation of application No. 15/156,002, filed on May 16, 2016, now Pat. No. 10,302,766, which is a (Continued)

(30) Foreign Application Priority Data

Nov. 20, 2013 (JP) .................. 2013-240310
Jan. 22, 2014 (JP) .................. 2014-009860

(51) Int. Cl.
*G01S 17/42* (2006.01)
*G03B 13/36* (2021.01)
(Continued)

(52) U.S. Cl.
CPC ............ *G01S 17/10* (2013.01); *G01S 7/4863* (2013.01); *G01S 7/4865* (2013.01); *G01S 7/51* (2013.01);
(Continued)

(58) Field of Classification Search
CPC ...... G01S 17/89; G01S 17/107; G01S 17/936; G01S 17/88; G01S 7/4802; G01S 7/486;
(Continued)

(56) References Cited

U.S. PATENT DOCUMENTS 5,699,149 A 12/1997 Kuroda et al.
6,538,751 B2 3/2003 Ono
(Continued)

FOREIGN PATENT DOCUMENTS

CN 102753932 A 10/2012
JP H07-332966 A 12/1995
(Continued)

OTHER PUBLICATIONS

Japanese Office Action dated Oct. 23, 2018 issued in Japanese Patent Application No. 2018-147101 (with English translation).
(Continued)

*Primary Examiner* — Luke D Ratcliffe
(74) *Attorney, Agent, or Firm* — McDermott Will & Emery LLP

(57) ABSTRACT

A range imaging system includes a light source unit configured to emit an irradiation light beam to an object, an imaging unit including a solid-state imaging device, and a calculation unit. The solid-state imaging device outputs an image capture signal for forming an image and an imaging signal of a light beam which is obtained when the irradiation light beam emitted is reflected by the object. The calculation unit is configured to calculate range information from the imaging signal, the range information being stored in association with the image.

10 Claims, 31 Drawing Sheets

Related U.S. Application Data continuation of application No. PCT/JP2014/005821, filed on Nov. 19, 2014.

(51) Int. Cl.
| | |
|---|---|
| *G01S 7/4863* | (2020.01) |
| *G01S 7/4865* | (2020.01) |
| *G01S 7/51* | (2006.01) |
| *G03B 13/20* | (2021.01) |
| *H04N 5/232* | (2006.01) |
| *H04N 9/04* | (2006.01) |
| *G01S 17/894* | (2020.01) |
| *G01S 7/481* | (2006.01) |
| *G01S 17/10* | (2020.01) |
| *G02B 7/28* | (2021.01) |
| *G02B 7/40* | (2021.01) |
| *G01S 17/931* | (2020.01) |

(52) U.S. Cl.
CPC ............ *G01S 17/42* (2013.01); *G01S 17/894* (2020.01); *G01S 17/931* (2020.01); *G02B 7/28* (2013.01); *G02B 7/40* (2013.01); *G03B 13/20* (2013.01); *G03B 13/36* (2013.01); *H04N 5/23293* (2013.01); *H04N 9/04553* (2018.08); *H04N 9/04559* (2018.08); *G01S 7/4815* (2013.01)

(58) Field of Classification Search
CPC ........ G01S 17/08; G01S 17/50; G01S 17/023; G01S 17/10; G01S 17/931; G01S 17/894; G01S 7/4863; G01S 7/4865; G01S 7/51; G01S 17/42; G01S 7/4815; G06K 9/00805; H04N 9/04553; H04N 9/04559; H04N 5/23293; G02B 7/28; G02B 7/40; G03B 13/20; G03B 13/36
See application file for complete search history.

(56) References Cited

U.S. PATENT DOCUMENTS

| | | | |
|---|---|---|---|
| 6,741,082 | B2 | 5/2004 | Ono |
| 7,527,205 | B2 * | 5/2009 | Zhu ................... G06K 7/10891 235/462.14 |
| 7,570,281 | B1 | 8/2009 | Ono |
| 8,134,637 | B2 | 3/2012 | Rossbach et al. |
| 8,139,116 | B2 | 3/2012 | Murayama |
| 8,139,141 | B2 | 3/2012 | Bamji et al. |
| 8,139,142 | B2 | 3/2012 | Bamji et al. |
| 8,705,013 | B2 | 4/2014 | Inoue |
| 9,046,364 | B2 | 6/2015 | Kojo et al. |
| 2001/0021011 | A1 | 9/2001 | Ono |
| 2002/0040971 | A1 | 4/2002 | Ono |
| 2005/0057741 | A1 | 3/2005 | Anderson et al. |
| 2005/0285966 | A1 | 12/2005 | Bamji et al. |
| 2006/0221250 | A1 * | 10/2006 | Rossbach ............. H04N 5/2355 348/630 |
| 2007/0279615 | A1 | 12/2007 | Degnan et al. |
| 2008/0122933 | A1 | 5/2008 | Murayama |
| 2011/0285910 | A1 | 11/2011 | Bamji et al. |
| 2012/0013886 | A1 | 1/2012 | Park et al. |
| 2012/0044093 | A1 | 2/2012 | Pala |
| 2012/0050717 | A1 | 3/2012 | Inoue |
| 2013/0038882 | A1 | 2/2013 | Umeda et al. |
| 2013/0182906 | A1 | 7/2013 | Kojo et al. |
| 2014/0358418 | A1 | 12/2014 | Nakajima et al. |
| 2015/0049329 | A1 * | 2/2015 | Bridges ................. G06F 3/0304 356/51 |
| 2015/0160340 | A1 | 6/2015 | Grauer et al. |
| 2015/0243081 | A1 * | 8/2015 | Ueno ................... G06T 19/006 345/633 |

FOREIGN PATENT DOCUMENTS

| | | |
|---|---|---|
| JP | H11-148806 A | 6/1999 |
| JP | 2001-084485 A | 3/2001 |
| JP | 2002-031516 A | 1/2002 |
| JP | 2002-174683 A | 6/2002 |
| JP | 2003-028960 A | 1/2003 |
| JP | 2004-205222 A | 7/2004 |
| JP | 2007-526453 A | 9/2007 |
| JP | 2008-008700 A | 1/2008 |
| JP | 2010-256291 A | 11/2010 |
| JP | 2010-271306 A | 12/2010 |
| JP | 2011-243862 A | 12/2011 |
| JP | 2012-021971 A | 2/2012 |
| JP | 2012-029130 A | 2/2012 |
| JP | 2012-047830 A | 3/2012 |
| JP | 2013-104784 A | 5/2013 |
| JP | 2013-207415 A | 10/2013 |
| WO | 2012172870 A1 | 12/2012 |

OTHER PUBLICATIONS

Non-Final Office Action issued in related U.S. Appl. No. 15/156,002 dated Oct. 19, 2018.
International Search Report dated Feb. 24, 2015, in parent International Application No. PCT/JP2014/005821 (English translation provided).
Office Action issued in Japanese Application No. 2015-548991 dated Jun. 5, 2018.
Chinese Office Action issued in corresponding Chinese Patent Application No. 201480061442.5, dated Nov. 3, 2020, with English translation.

* cited by examiner

FIG. 2A

| Passive pixel | Passive pixel | Passive pixel | Passive pixel |
|---|---|---|---|
| Active pixel | Passive pixel | Active pixel | Passive pixel |
| Passive pixel | Passive pixel | Passive pixel | Passive pixel |
| Active pixel | Passive pixel | Active pixel | Passive pixel |

FIG. 2B

| R | G | R | G |
|---|---|---|---|
| IR | B | IR | B |
| R | G | R | G |
| IR | B | IR | B |

FIG. 2C

| Passive-active dual-purpose pixel | Passive-active dual-purpose pixel | Passive-active dual-purpose pixel | Passive-active dual-purpose pixel |
|---|---|---|---|
| Passive-active dual-purpose pixel | Passive-active dual-purpose pixel | Passive-active dual-purpose pixel | Passive-active dual-purpose pixel |
| Passive-active dual-purpose pixel | Passive-active dual-purpose pixel | Passive-active dual-purpose pixel | Passive-active dual-purpose pixel |
| Passive-active dual-purpose pixel | Passive-active dual-purpose pixel | Passive-active dual-purpose pixel | Passive-active dual-purpose pixel |

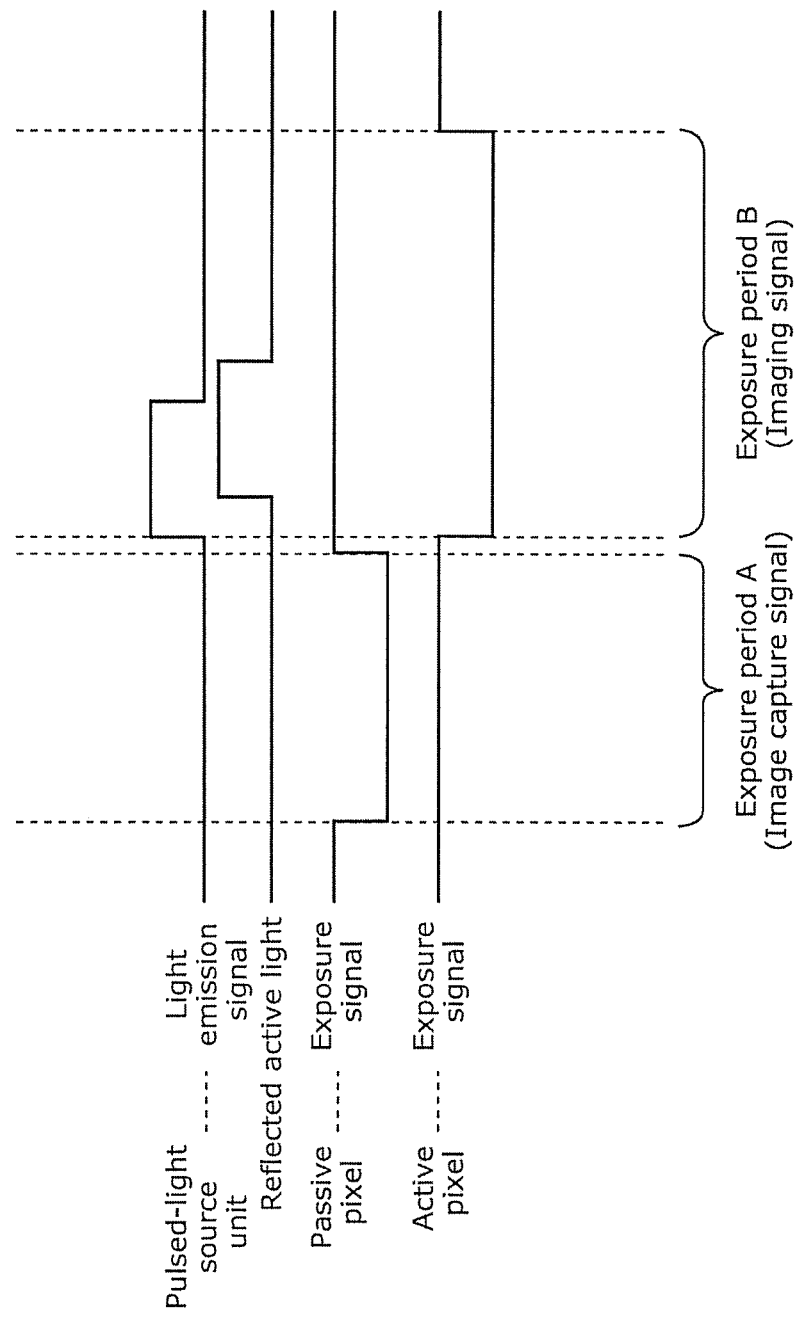

Subject (Obstacle)

Region A  Subject (Obstacle)

Subject
(Obstacle)

Irradiation point

Irradiation point a   Irradiation point b

Irradiation point

RANGE IMAGING SYSTEM AND SOLID-STATE IMAGING DEVICE

CROSS REFERENCE TO RELATED APPLICATIONS

This is a continuation application of U.S. application Ser. No. 15/156,002 filed on May 16, 2016, which is a continuation application of PCT International Application No. PCT/JP2014/005821 filed on Nov. 19, 2014, designating the United States of America, which is based on and claims priority of Japanese Patent Applications No. 2013-240310 filed on Nov. 20, 2013 and No. 2014-009860 filed on Jan. 22, 2014. The entire disclosures of the above-identified applications, including the specifications, drawings and claims are incorporated herein by reference in their entirety.

FIELD

The present disclosure relates to a range imaging system and a solid-state imaging device.

BACKGROUND

Various kinds of ranging systems have been proposed. Among these ranging systems, a conventional ranging system disclosed in Patent Literature 1 includes the following: a control unit that integrally controls the other units; an infrared (IR) light emitting unit that emits IR light toward an imaging target space; a lens that condenses visible light and IR light from the imaging target space; and a solid-state imaging device that photoelectrically converts the light condensed by the lens into a pixel signal and outputs the pixel signal. Using these structural elements, this ranging system forms a visible light image and a range image.

FIG. 32 is a functional block diagram showing a schematic configuration of a conventional ranging system. As shown in FIG. 32, a solid-state imaging device included in the ranging system includes the following: a B light receiving unit that receives blue (B) light and accumulates B-signal charge; a G light receiving unit that receives green (G) light and accumulates G-signal charge; an R light receiving unit that receives red (R) light and accumulates R-signal charge; and an IR light receiving unit that receives infrared (IR) light and accumulates IR-signal charge.

CITATION LIST

Patent Literature

Patent Literature 1: Japanese Unexamined Patent Application Publication No. 2008-8700

SUMMARY

Technical Problem

According to the conventional technique disclosed in Patent Literature 1, however, a visible light image is formed using the signals from the B, G, R light receiving units and a range image is formed using the signal from the IR light receiving unit. Here, note that a distance calculated from the range image is limited to a distance to a subject image. Moreover, image processing using the subject image and the range image to separately read the visible light image and the range image includes only image synthesis in which an image of a person is extracted from the image to change the background.

In other words, ranging disclosed in Patent Literature 1 is performed using only the range image formed by the signal from the IR light receiving unit, thereby providing low ranging performance. In view of the aforementioned problem, one non-limiting and exemplary embodiment provides a range imaging system and a solid-state imaging device having high ranging performance.

Solution to Problem

To solve the aforementioned problem, a range imaging system according to an aspect of the present disclosure includes: a signal generation unit which generates a light emission signal for instructing light irradiation and an exposure signal for instructing exposure; a pulsed-light source unit which emits pulsed light in response to the light emission signal; an imaging unit which includes a solid-state imaging device and performs exposure and imaging in response to the exposure signal; and a calculation unit which calculates range information, wherein the solid-state imaging device includes a first pixel for receiving radiant light from a subject and a second pixel for receiving reflected light of the pulsed light, and the calculation unit calculates the range information using an image capture signal from the first pixel and an imaging signal from the second pixel.

Moreover, the calculation unit according to an aspect of the present disclosure may calculate a dimension of the subject, using a distance to the subject calculated from the image capture signal and the imaging signal.

Furthermore, the range imaging system according to an aspect of the present disclosure may include a detection unit which detects at least one subject from a whole subject scene using the image capture signal. The pulsed-light source unit may perform the light irradiation on the detected subject. The calculation unit may calculate a distance to the subject, as the range information, using the imaging signal.

Moreover, the range imaging system according to an aspect of the present disclosure may include a detection unit which detects at least one subject from a whole subject scene using the image capture signal. The pulsed-light source unit may perform the light irradiation on the detected subject. The calculation unit may calculate a distance to the subject using the imaging signal, and further calculate a dimension of the subject using the imaging signal and the distance to the subject.

Furthermore, the pulsed-light source unit according to an aspect of the present disclosure may irradiate a partial region of the subject with the pulsed light. The calculation unit may calculate the distance to the subject and the dimension of the subject, on the basis of the partial region of the subject.

Moreover, the range imaging system according to an aspect of the present disclosure may be mounted to transportation equipment, and the subject may be another piece of transportation equipment. The range imaging system may perform at least a part of drive control of the transportation equipment mounted to the range imaging system, using a distance to the other transportation equipment.

Furthermore, the range imaging system according to an aspect of the present disclosure may be mounted to portable equipment, and the calculation unit may calculate the dimension of the subject displayed on a display unit of the portable equipment. Moreover, the pulsed-light source unit according to an aspect of the present disclosure may include a line lens.

Furthermore, the range imaging system according to an aspect of the present disclosure may include a second light source which emits light synchronizing with the pulsed light emitted to the subject. Moreover, the range imaging system according to an aspect of the present disclosure may include a detection unit which detects a state of a ranging environment using the image capture signal. The calculation unit may select between the image capture signal and the imaging signal to calculate the range information, according to the state of the ranging environment, or may correct one of the image capture signal and the imaging signal using the other one of the image capture signal and the imaging signal to calculate the range information, according to the state of the ranging environment.

Furthermore, the calculation unit according to an aspect of the present disclosure may select between the image capture signal and the imaging signal to calculate the range information, on the basis of information stored in the range imaging system, or may correct one of the image capture signal and the imaging signal using the other one of the image capture signal and the imaging signal to calculate the range information.

Moreover, the calculation unit according to an aspect of the present disclosure may calculate the range information by comparing a current frame with a preceding frame using the image capture signal.

Furthermore, the range imaging system according to an aspect of the present disclosure may select between the image capture signal and the imaging signal to calculate the range information, on the basis of an imaging magnification, a time of day or night, a weather condition, a distance to the subject, or a motion speed of the subject or the range imaging system.

Moreover, the range imaging system according to an aspect of the present disclosure may be mounted to transportation equipment.

Furthermore, the calculation unit according to an aspect of the present disclosure may calculate a distance by a time-of-flight method.

Moreover, the pulsed-light source unit according to an aspect of the present disclosure may emit laser light.

Furthermore, the pulsed-light source unit according to an aspect of the present disclosure may include a single-color light emitting element or a multi-color light emitting element.

Moreover, according to an aspect of the present disclosure, the first pixel may receive visible light and the second pixel receives light other than the visible light.

Furthermore, according to an aspect of the present disclosure, the light other than the visible light may be infrared light.

Moreover, according to an aspect of the present disclosure, the first pixel may further receive reflected light of the pulsed light and the second pixel may further receive radiant light from the subject.

Furthermore, the pulsed-light source unit according to an aspect of the present disclosure may include a light source and a light-source moving unit. The light-source moving unit may divide source light from the light source and emit a plurality of pulsed light beams.

Moreover, the light-source moving unit according to an aspect of the present disclosure may be a diffraction grating.

Furthermore, the range imaging system according to an aspect of the present disclosure may determine irradiation directions of the pulsed light beams, arrangement of irradiation points of the subject, or shapes of the pulsed light beams, on the basis of the image capture signal.

Moreover, according to an aspect of the present disclosure, the pulsed light beams may be emitted at inconstant periodic timings or individually unique timings.

Furthermore, according to an aspect of the present disclosure, the range information may be calculated using dispersion of the pulsed light beams.

Advantageous Effects

A range imaging system according to the present disclosure can achieve high ranging precision.

BRIEF DESCRIPTION OF DRAWINGS

These and other objects, advantages and features will become apparent from the following description thereof taken in conjunction with the accompanying drawings, by way of non-limiting examples of embodiments disclosed herein.

FIG. 2A is a planar structure diagram showing an example of a configuration of a solid-state imaging device (an image sensor) included in the range imaging system according to Basic Configuration in Embodiments.

FIG. 2B is a planar structure diagram showing a specific example of the solid-state imaging device shown in FIG. 2A.

FIG. 2C is a planar structure diagram showing a modification example of the solid-state imaging device shown in FIG. 2A.

FIG. 3 is a timing chart showing an example of operations of a light emission signal and an exposure signal according to Basic Configuration in Embodiments.

DESCRIPTION OF EMBODIMENTS

The following describes a range imaging system according to embodiments of the present disclosure, with reference to the drawings. Each of the exemplary embodiments described below shows a general or specific example. Therefore, the numerical values, shapes, materials, structural elements, the arrangement and connection of the structural elements, and so forth shown in the exemplary embodiments below are mere examples, and therefore do not limit the present disclosure.

Note also that range imaging systems according to Embodiments 1 to 5 described below can be used in combination.

Basic Configuration in Embodiments

Figure 1:
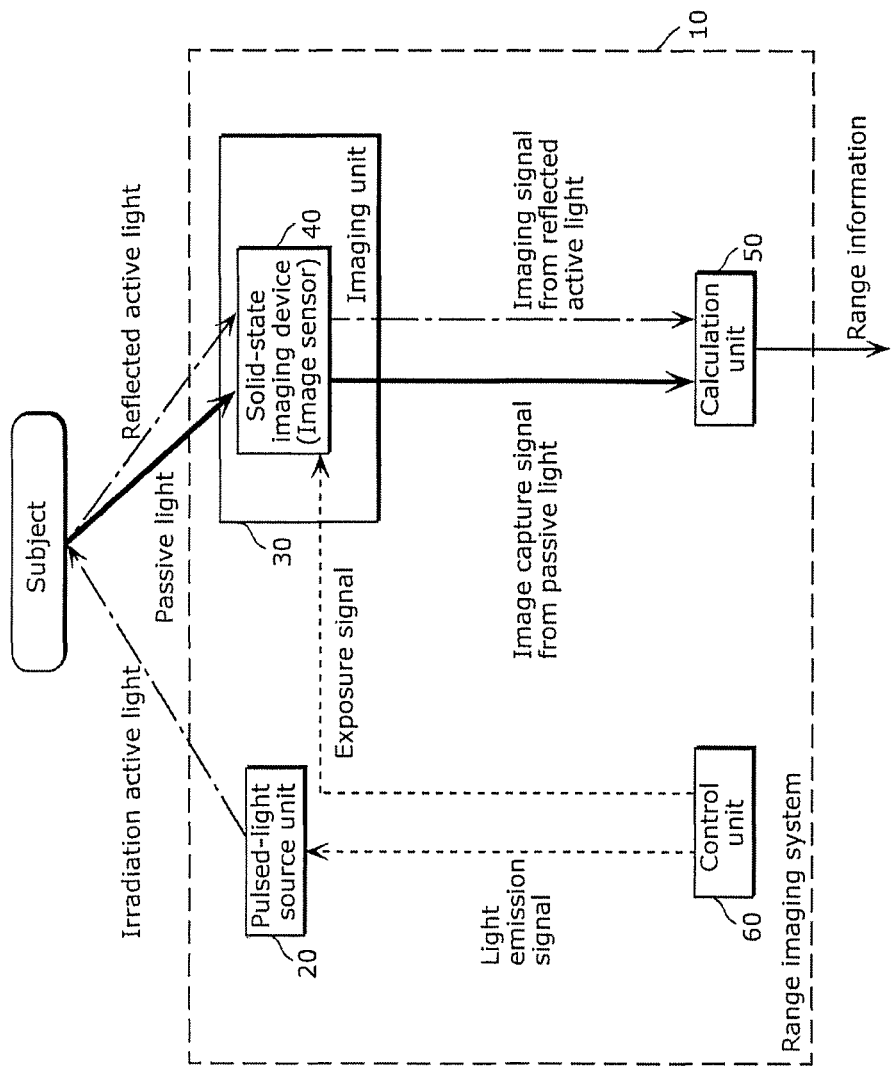
FIG. 1 is a schematic functional block diagram showing an example of a basic configuration of a range imaging system according to Basic Configuration in Embodiments.

FIG. 1 is a schematic functional block diagram showing an example of a basic configuration of a range imaging system 10 according to Basic Configuration in Embodiments.

As shown in FIG. 1, the range imaging system 10 includes an imaging unit 30, a pulsed-light source unit 20, a control unit 60, and a calculation unit 50.

The pulsed-light source unit 20 performs light irradiation for ranging of a subject, according to timing of receiving a light emission signal generated by the control unit 60. The pulsed-light source unit 20, which has a drive circuit, a capacitor, and a light emitting element, emits pulsed light (hereinafter, referred to as the irradiation active light) by supplying electrical charge held by the capacitor to the light emitting element. As an example, the irradiation active light is infrared light (IR light) including near-infrared light. Various kinds of light emitting elements, such as a laser diode and a light emitting diode (LED), can be used as the light emitting element.

The light emitting element does not have to be a single-color light emitting element. For example, irradiation may be selectively performed by the light emitting element that emits visible light (near-infrared light, for instance). To be more specific, a combination of light emitting elements that emit light of different colors, such as a red light emitting element, a blue light emitting element, and a yellow light emitting element, may be used. With this, light selected from among wavelength regions of emitted light (such as near-infrared light) can be emitted.

In addition to light dispersed in various directions (that is, typical light), laser light can be emitted as the irradiation active light. Laser light is superior in directivity and convergence performance and can keep the generated electromagnetic wavelength constant.

The control unit 60 generates a light emission signal to instruct the pulsed-light source unit 20 to emit the irradiation active light. Moreover, the control unit 60 generates the following signals: an exposure signal to instruct the imaging unit 30 to expose reflected light of the irradiation active light (hereinafter, this reflected light is referred to as the reflected active light); and an exposure signal to expose subject light, which is usual light caused by outside light such as sunlight or indoor lighting, in other words, radiant light from the subject instead of resulting from the irradiation active light (hereinafter, this radiant light is referred to as the passive light). In this way, the control unit 60 has a function as a signal generation unit that generates the light emission signal for instructing light emission and the exposure signal for instructing exposure.

The imaging unit 30 has a camera lens and a solid-state imaging device 40 (an image sensor), and performs exposure and imaging in response to the exposure signal.

In response to the exposure signal, the solid-state imaging device 40 receives the passive light from the subject and outputs an image capture signal.

Moreover, in response to the exposure signal, the solid-state imaging device 40 receives the reflected active light reflected off the subject irradiated with the irradiation active light emitted from the pulsed-light source unit 20, and outputs an imaging signal.

The calculation unit 50 outputs range information of the subject, on the basis of both the image capture signal and the imaging signal from the imaging unit 30. More details are described in the following embodiments.

It should be noted that the following embodiments include an example in which the solid-state imaging device 40 has a circuit, such as an analog-to-digital (A/D) converter, that digitizes the image capture signal and the imaging signal before outputting these signals.

It should be noted that the following embodiments include an example in which some or all of the structural elements included in each of the control unit 60, the imaging unit 30, and the calculation unit 50 are integrated into a single chip on a semiconductor substrate.

Furthermore, according to the range imaging systems described in the following embodiments, information on a measurable distance is not limited to a distance to the subject. For example, various distances (dimensions), such as dimensions (including the height and width) of the subject, can be outputted. More details are described in the following embodiments.

FIG. 2A is a planar structure diagram showing an example of the solid-state imaging device 40 according to Basic Configuration in Embodiments.

As shown in FIG. 2A, the solid-state imaging device 40 includes a pixel for receiving the passive light (hereinafter, referred to as a first pixel or a passive pixel) and a pixel for receiving the reflected active light (hereinafter, referred to as a second pixel or an active pixel).

FIG. 2B is a planar structure diagram showing a specific example of the solid-state imaging device shown in FIG. 2A. In the example shown in FIG. 2B, each of the passive pixels has a filter that lets through one of R, G, and B light whereas each of the active pixels has a filter that lets through IR light. Thus, in the range imaging system 10 including the solid-state imaging device 40 shown in FIG. 2B, the pulsed-light source unit 20 emits IR light other than visible light and the active pixel receives IR light other than visible light. FIG. 2C is a planar structure diagram showing a modification example of the solid-state imaging device shown in FIG. 2A. In Embodiments, the solid-state imaging device 40 may include a dual-purpose pixel used as both the passive pixel and the active pixel as shown in FIG. 2C, instead of the structure shown in FIG. 2A or FIG. 2B. More specifically, the passive pixel (the first pixel) may further receive the reflected light (the reflected active light) of the pulsed light (the irradiation active light). The active pixel (the second pixel) may further receive the radiant light (the passive light) from the subject. The advantages in this case include, for example, high-sensitivity imaging (high-sensitivity photographing) because of the increased size of a light receiving area (a pixel area) in the solid-state imaging device 40 capable of receiving both the passive light and the reflected active light.

With the corresponding filter for R, G, or B, each of the passive pixels receives the passive light. Thus, the R, G, or B pixel outputs an image capture signal as a corresponding R, G, or B component. On the other hand, each of the IR pixels receives the reflected active light and outputs an imaging signal.

Note that the passive pixel may include an infrared cut filter in the corresponding R, G, or B filter.

Note also that the R, G, and B filters of the passive pixels may be R+IR, G+IR, and B+IR filters. In this case, infrared light included in the passive light is received as follows: the R+IR pixel receives an R component and a part of an infrared component; the G+IR receives a G component and a part of the infrared component; and the B+IR pixel receives a B component and a part of the infrared component. Then, each of these pixels outputs the corresponding image capture signal.

To be more specific, a visible light image can be captured since the passive pixels receive the passive light, and at the same time, an infrared light image that can be captured even in, for example, the darkness can be obtained as well.

The passive pixel may output the image capture signal based on the IR light.

The passive pixels may not have the respective R, G, and B filters. In such a case, a monochrome image can be captured. Alternatively, the pixels may have a structure with which a color image can be captured without the filters (for example, a structure in which the depth of an impurity region of the pixel [photodiode] is changed or the type or density of impurities is changed).

The active pixel may have a structure with which the reflected passive light can be exposed without the filter (for example, a structure in which the depth of an impurity region of the pixel [photodiode] is changed or the type or density of impurities is changed).

Next, FIG. 3 is a timing chart showing an example of operations of the light emission signal and the exposure signal according to Basic Configuration in Embodiments. This diagram shows an operation of the range imaging system according to Embodiments, and particularly shows timings at which control signals (the light emission signal and the exposure signal) are transmitted from the control unit 60 to the pulsed-light source unit 20 and the imaging unit 30 (the solid-state imaging device 40) as well as timings of the reflected active light.

First, the imaging unit 30 (the solid-state imaging device 40) exposes the passive light in response to the exposure signal during an exposure period A shown in FIG. 3. Next, during an exposure period B shown in FIG. 3, the pulsed-light source unit 20 emits the irradiation active light in response to the light emission signal while the imaging unit 30 (the solid-state imaging device 40) exposes the reflected active light in response to the exposure signal.

The order in which the passive light and the reflected active light are exposed is not limited to the example shown in FIG. 3. For instance, exposures of the passive light and the reflected active light may be repeated.

FIG. 3 shows an example in which the exposure period B starts after a predetermined period of time following the end of the exposure period A. However, the present disclosure is not limited to this, and various operation methods can be used. Examples include the following: the exposure period B starts during the exposure period A (that is, the exposure period A and the exposure period B coincide with each other); and the exposure period B starts upon the end of the exposure period A.

Embodiment 1

The following describes a configuration and an operation of a range imaging system 10 according to Embodiment 1, with reference to the drawings. Note that the following mainly describes details of differences from Basic Configuration described thus far.

Figure 4:
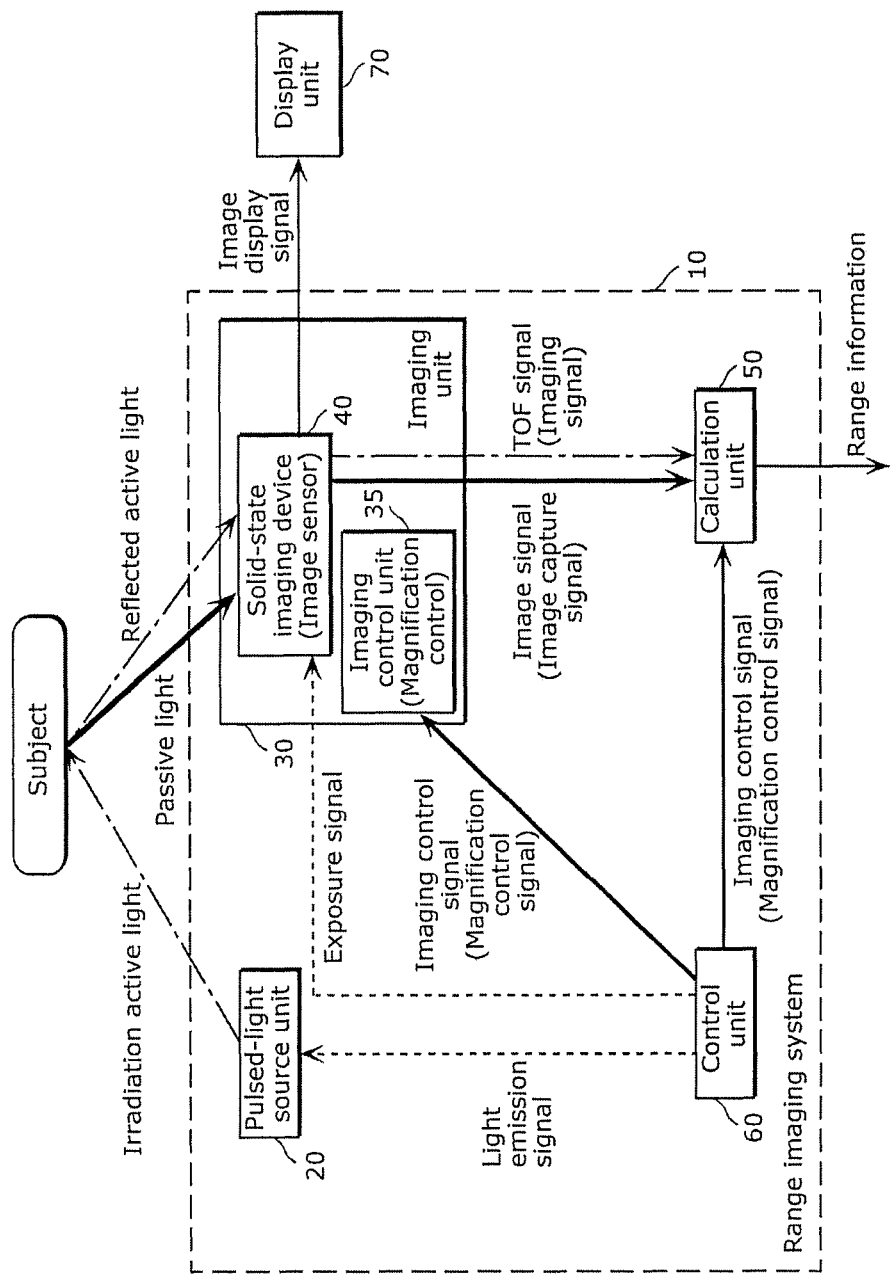
FIG. 4 is a functional block diagram showing a schematic configuration example of a range imaging system according to Embodiment 1.
Figure 5:
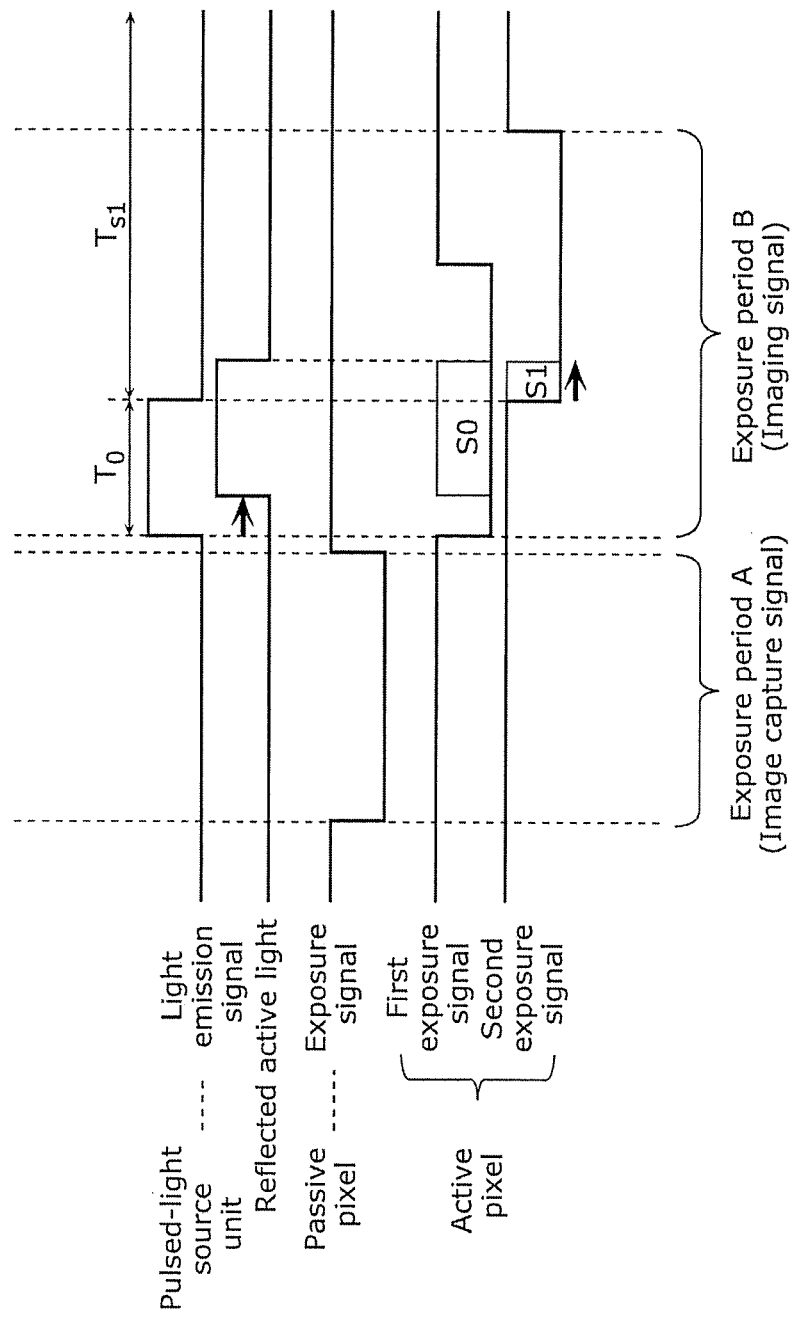
FIG. 5 is a timing chart showing an example of operations of a light emission signal and an exposure signal according to Embodiment 1.

FIG. 4 is a functional block diagram showing a schematic configuration example of the range imaging system 10 according to Embodiment 1. FIG. 5 is a timing chart showing an example of operations of a light emission signal and an exposure signal according to Embodiment 1. This diagram shows an operation of the range imaging system 10 according to Embodiment 1, and particularly shows timings at which control signals are transmitted from a control unit 60 to a pulsed-light source unit 20 and an imaging unit 30 (a solid-state imaging device 40) as well as timings of reflected active light.

Differences from the basic configuration shown in FIG. 1, FIG. 2A to 2C, and FIG. 3 are mainly explained. The control unit 60 outputs an imaging control signal to the imaging unit 30 (an imaging control unit 35) and a calculation unit 50. This imaging control signal is used to control optical magnification or electronic magnification via, for example, the imaging control unit 35 in the imaging unit 30 to cause a display unit 70 to display an image of a target part of a subject to be measured with passive light. More specifically, an operation of the imaging control unit 35 includes, as an example, controlling an optical component, such as a zoom lens of a camera. Note that this dimensional measurement of the subject is described later.

The imaging unit 30 outputs an image capture signal obtained by capturing an image of the subject during an exposure period A shown in FIG. 5.

Moreover, the imaging unit 30 performs exposure (light reception) multiple times on a region including a target object (the subject), according to timings indicated by the exposure signals generated by the control unit 60 (a signal generation unit). Then, during an exposure period B shown in FIG. 5, the imaging unit 30 outputs a time-of-flight (TOF) signal, which is a range signal corresponding to a total amount of multiple exposures, as an imaging signal.

Next, the following describes details of an operation method and range calculation of the range imaging system 10 according to Embodiment 1. The range imaging system 10 can measure a distance to the subject as well as the dimensions of the subject, such as the height and width of the subject.

First, the details of the measurement and calculation of the distance to the subject are described, with reference to FIG. 5. Here, the basic principle is presented by a TOF method by which a distance is measured from a period of time taken for projected light to travel to a measurement target and back. The reflected active light from the measurement target (the subject) is exposed by the active pixels in the solid-state imaging device 40 in two patterns, i.e., at two different timings with a first exposure signal and a second exposure signal as the exposure signals in response to the light emission signal. Then, the distance to the measurement target is calculated on the basis of a ratio of the amounts of light by the exposures. To be more specific, exposure is performed on the subject multiple times according to the timings indicated by the exposure signals generated by the control unit 60, and the imaging signal corresponding to a total amount of multiple exposures is outputted.

For example, the first exposure signal causes the reflected light from the measurement target to be fully covered by exposure. Moreover, the second exposure signal causes the amount of exposure to increase with a delay of the reflected light of the measurement target from the light emission timing. To detect an offset component, such as background light, the light emission signal is stopped and exposure is performed under the same conditions as those of the first and second exposure signals.

Then, a distance L to the subject is calculated using Expression 1 below. In Expression 1, S1 represents a total amount of exposure by the first exposure signal, S0 represents a total amount of exposure by the second exposure signal, BG represents a total amount of exposure for background light, T0 represents a duration of the light emission signal of direct light to be emitted, and c represents a light speed. Hereinafter, this range calculation is referred to as the TOF range calculation.

$$L = \frac{c \cdot T_0}{2} \times \left(\frac{S1 - BG}{S0 - BG}\right) \qquad \text{Expression 1}$$

The timings of the light emission signal, the first exposure signal, and the second exposure signal for one screen may be as follows. The light emission signal and the first exposure signal are outputted multiple times. Following this, the light emission signal and the second exposure signal are outputted the same multiple times. Then, after this, the light emission signal is stopped in order for the exposure signals to be outputted the same multiple times under the same conditions as those of the first and second exposure signals. With this sequence of timings being one set, multiple sets of signal output may be performed. Then, with the output of the accumulated amount of exposure, the distance to the subject may be calculated by Expression 1.

The range imaging system 10 according to Embodiment 1 may use a different method other than the aforementioned TOF method. Examples of such a method include a pattern irradiation method by which range calculation is performed using a distortion caused in the reflected active light obtained by the application of irradiation active light to the subject.

Next, details on the measurement and calculation of the dimensions of subject are described.

First, the solid-state imaging device 40 receiving the passive light captures an image of the subject according to the exposure signal from the control unit 60, and outputs an image signal (image capture signal) to the calculation unit 50.

The calculation unit 50 detects the subject on which the dimensional measurement is to be performed, and calculates a first subject dimension from, for example, a displayed dimension on the display unit 70 and initial values stored (or recorded) in the range imaging system 10.

Next, a dimension of the subject, such as the height or width, is calculated using the calculated first subject dimension and the distance to the subject that is calculated by the aforementioned TOF range calculation (while calculation correction is performed using the aforementioned image magnification coefficient [the imaging control signal] in some cases).

In this way, the range imaging system 10 according to Embodiment 1 can measure the distance to the subject as well as various distances (dimensions) of the subject (such as the height and width of the subject).

Moreover, according to the range imaging system 10 in Embodiment 1, the image signal (image capture signal) and the TOF signal (imaging signal) are outputted from the same device, that is, the solid-state imaging device 40. In other words, the imaging signals from the solid-state imaging device 40, which is a single-plate device, have the same imaging center (optical center or optical axis center). On this account, a phase difference between the imaging signals is small and thus the imaging signals are synchronized more accurately, for example. Hence, the dimensions of the subject can be measured accurately.

Here, even when including a plurality of solid-state imaging devices (that is, even when the imaging unit 30 is a stereo camera), the range imaging system 10 according to Embodiment 1 can measure the distance to the subject as well as the dimensions of the subject, such as the height and width.

Next, a mounting example of the range imaging system 10 according to Embodiment 1 is described.

Figure 6:
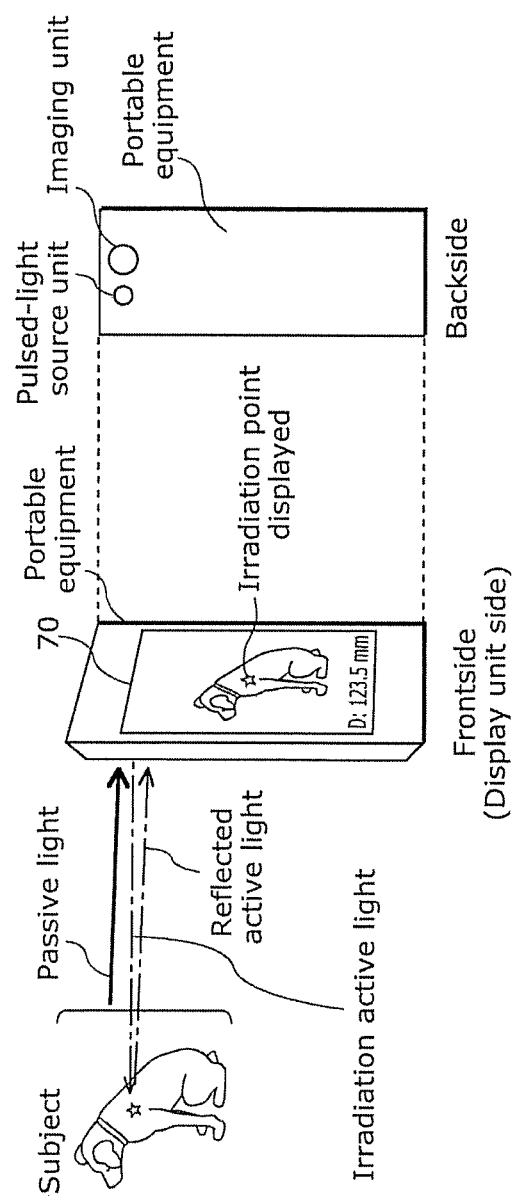
FIG. 6 is a schematic mounting diagram showing a first mounting example of the range imaging system according to Embodiment 1.

FIG. 6 is a schematic mounting diagram showing a first mounting example of the range imaging system 10 shown in FIG. 4. FIG. 6 is a diagram showing an example in which the range imaging system 10 is mounted to a smartphone (portable communication terminal) as an example of portable equipment.

In the example shown in FIG. 6, pointing this smartphone at an animal (subject) to display the subject on a display unit 70 of the smartphone enables the dimensions (such as the height and width) of the subject to be measured (ranged). To be more specific, the dimensions (such as the height and width) of the subject can be measured (ranged) by the aforementioned calculation performed by the calculation unit 50 using the following signals: the image signal (image capture signal) outputted from the solid-state imaging device 40 (the passive pixels) receiving the passive light; and the TOF signal (image signal) outputted from the solid-state imaging device 40 (the active pixels) receiving the reflected active light of the irradiation active light emitted from the pulsed-light source unit 20.

It is more preferable that the range information on the dimensions (such as the height and width) of the subject is stored in association with the passive signal (i.e., the image) obtained by imaging the subject with the passive light. With this, when the stored image is to be displayed on the display unit again, various kinds of dimensional information on the subject can be checked again by designating a desired part of the subject.

It is more preferable that the irradiation active light emitted from the pulsed-light source unit 20 is laser light in the mounting example shown in FIG. 6 as well as when more emphasis is placed on, for example, miniaturization of the range imaging system 10, reduction of the measurement time, and low power consumption.

More specifically, the subject can be irradiated with the irradiation active light using the laser light in the pinpoint accuracy, and thus the distance to the subject can be measured by means of the reflected active light from one point (partial region) on the subject. Then, the dimensions (such as the height and width) of the subject can be measured using this range information.

Thus, the imaging speed of the solid-state imaging device 40 is increased and the amount of signal is reduced. This can achieve, for example, miniaturization of the system, reduction of the measurement time, and low power consumption. Moreover, since the imaging signal represents signal information entirely from the subject, noise components in the imaging signal can be reduced. Therefore, the dimensions of the subject can be measured with high accuracy.

In the case where the pulsed-light source unit 20 emits laser light, the display unit 70 may display which part of the subject is irradiated with the irradiation active light (laser light). In the example of screen display shown in FIG. 6, a mark indicating an irradiation point on the subject irradiated with the irradiation active light is displayed. In addition, the dimension (such as the height or width) of the subject may be displayed on the display unit 70 as shown in FIG. 6.

Furthermore, in the case where the pulsed-light source unit 20 emits laser light, a visual laser light source, which is synchronized with the pulsed-light source unit 20 and has the optical axis appropriately adjusted, may be included. With this visual laser light source, which part of the subject is irradiated with the pulsed light can be checked easily and visually, for example. Thus, the subject may be irradiated with both the irradiation active light (laser light) and the visual laser light. In other words, the range imaging system 10 may include another light source that emits light (visual laser light, as an example) synchronizing with the pulsed light.

Figure 7:
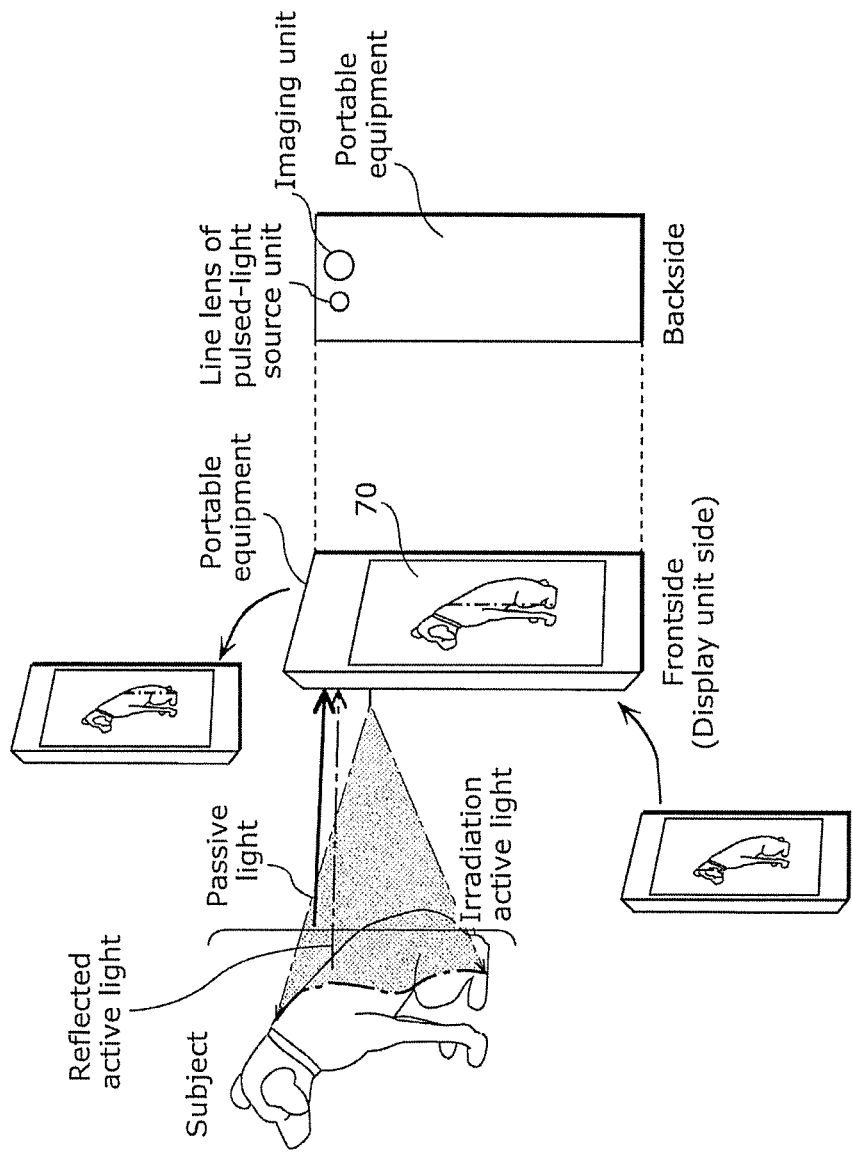
FIG. 7 is a schematic mounting diagram showing a second mounting example of the range imaging system according to Embodiment 1.

FIG. 7 is a schematic mounting diagram showing a second mounting example of the range imaging system 10 shown in FIG. 4. FIG. 7 is a diagram showing another example in which the range imaging system 10 is mounted to a smartphone (portable communication terminal) as an example of portable equipment.

The example shown in FIG. 7 is different from the example shown in FIG. 6 in that the pulsed-light source unit 20 in FIG. 7 is equipped with a line lens that enables the irradiation active light to be emitted as linear light to the subject. To be more specific, an irradiation region of the line lens has a linear shape or a long narrow strip shape. In the example of screen display in FIG. 7, an alternate long and short dash line indicates the irradiation region.

Capturing an image of the subject by irradiating the whole subject with this straight light sequentially like scanning allows three-dimensional dimensions of the subject to be measured (ranged) with high accuracy and at high speed. Then, the data based on the three-dimensional dimensions can be outputted using a three-dimensional printer (hereinafter, referred to as a 3D printer) with high accuracy and at high speed.

Figure 8:
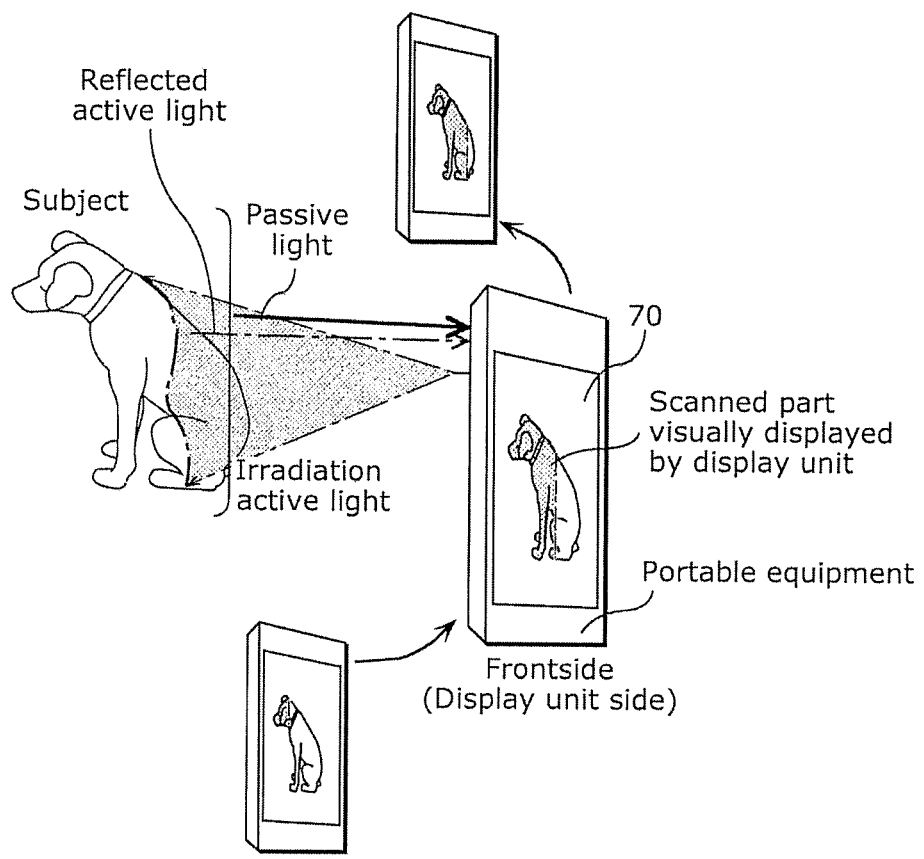
FIG. 8 is a diagram showing an example of an operation in the second mounting example of the range imaging system according to Embodiment 1.

To output the data using the 3D printer, an enormous amount of data is typically required, and a long calculation and output time is also required. However, with the range imaging system 10 according to Embodiment 1, the calculation time and the output time can be reduced, during which both the calculation and the output are performed at high accuracy. This reduction in time enables the data output using the 3D printer to be performed speedily and easily. FIG. 8 is a diagram showing an example of an operation in the second mounting example. In the case where the image of the whole subject is sequentially captured (or, scanned) as shown in FIG. 8, a display unit of the portable equipment may display the scanned part by adding a change in the image (as an example, the scanned part may be colored) on the display unit. Such display can make it easy to check the scanning and also can improve the scanning accuracy. In the example of screen display in FIG. 8, an alternate long and short dash line indicates the irradiation region and a shaded region indicates the scanned part.

Figure 9:
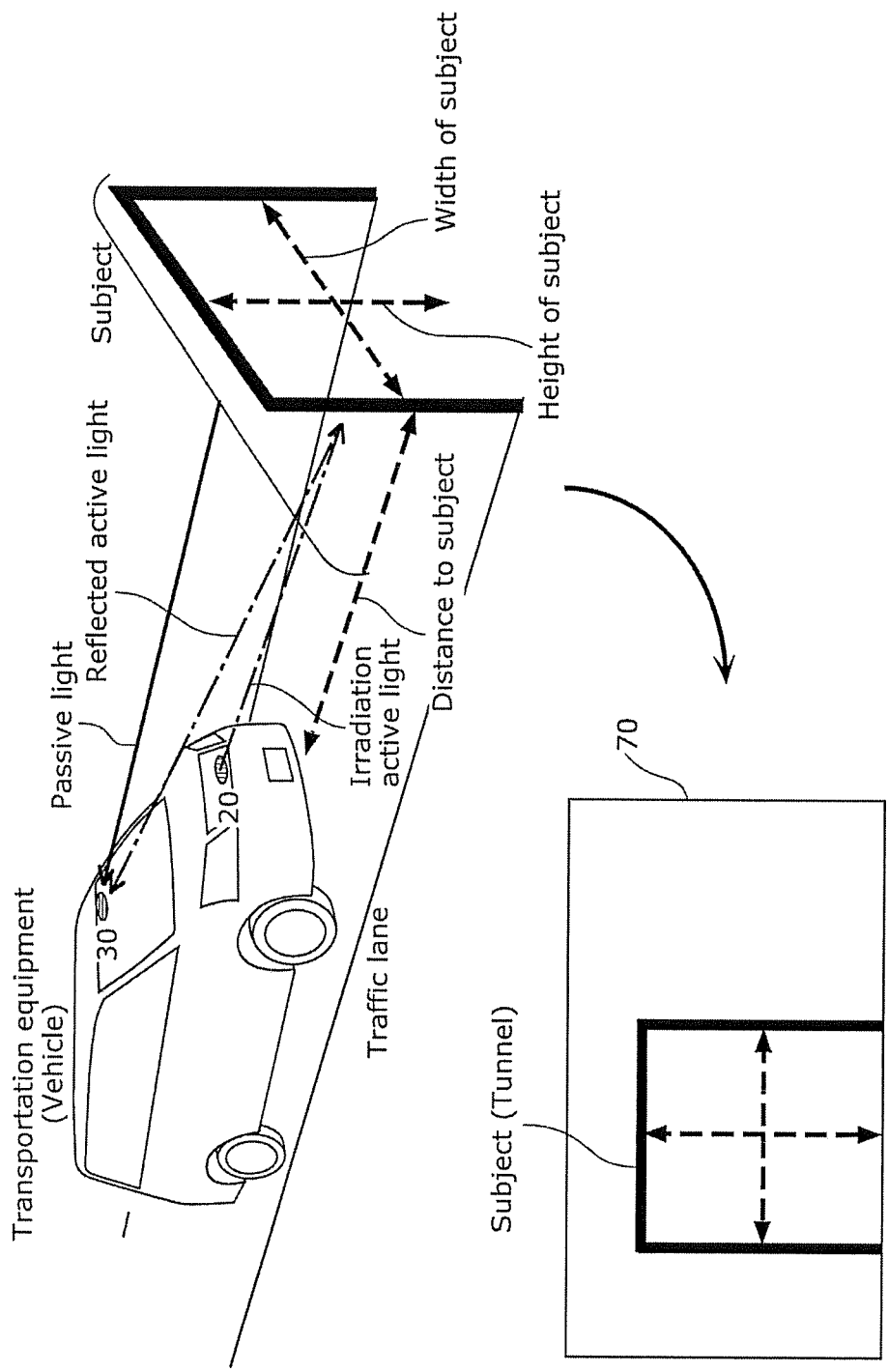
FIG. 9 is a schematic mounting diagram showing a third mounting example of the range imaging system according to Embodiment 1.

FIG. 9 is a schematic mounting diagram showing a third mounting example of the range imaging system 10 shown in FIG. 4. FIG. 9 is a diagram showing an example in which the range imaging system 10 is mounted to a vehicle (transportation equipment).

In FIG. 9, the pulsed-light source unit 20 is placed in a front grille and the imaging unit 30 is placed in an upper interior (near a rearview mirror) of the vehicle.

The placement of the range imaging system 10 is not limited to the above. For example, the pulsed-light source unit 20 may be placed in a headlight or a fog lamp, and the imaging unit 30 may be placed in a front grille or a front bumper.

Subjects in FIG. 9 include a road under an elevated structure, or alternatively called a tunnel (hereinafter, collectively referred to as the tunnel), which can be an obstacle. Assume that the vehicle is going to drive through this tunnel.

In this case, the range imaging system 10 according to Embodiment 1 mounted to the vehicle measures a distance to the tunnel as well as the dimensions (such as the height and width) of the tunnel using the following signals: the image signal (image capture signal) outputted from the solid-state imaging device 40 (the passive pixels) receiving the passive light; and the TOF signal (image signal) outputted from the solid-state imaging device 40 (the active pixels) receiving the reflected active light.

With this, a driver of this vehicle can find the distance to the tunnel that can be an obstacle. Moreover, the driver can also determine, for example, whether the vehicle of the driver can drive through the tunnel (the subject).

Furthermore, the dimensions of the vehicle or the like may be previously stored (or recorded) as initial values (as initial information, stored information, or recorded information) into the system. With this, when the system determines that it is difficult for the vehicle to drive through the obstacle, in addition to when the vehicle approaches the obstacle (the subject), an issue of an alarm or the like, automatic speed control, or automatic stop can be executed for example. Hence, a risk can be avoided more easily.

Although the range imaging system 10 according to Embodiment 1 is mounted for the purpose of making a measurement in front of the vehicle in FIG. 9, the purpose is not limited to this. For example, the range imaging system 10 may be placed near the license plate at the back of the vehicle to make a measurement behind the vehicle. Alternatively, the range imaging system 10 may also be placed on, for example, a sideview mirror to make a measurement on the side of the vehicle.

Although the range imaging system 10 according to Embodiment 1 has been described with reference to FIG. 7 to FIG. 9, the mounting example is not limited to the above in which the range imaging system 10 is mounted to the portable equipment and the vehicle. For example, the range imaging system 10 can be mounted to various kinds of equipment and facilities including the following: other transportation equipment (such as a motorcycle, a railroad vehicle, an airplane, and a spacecraft); other portable equipment (such as a notebook personal computer [PC], a tablet PC, portable information equipment, and a portable communication terminal); transportation equipment; infrastructure equipment; heavy equipment (such as a power shovel and a bulldozer); and household equipment.

Embodiment 2

The following describes a configuration and an operation of a range imaging system 10 according to Embodiment 2, with reference to the drawings. Note that the following mainly describes details of differences from Basic Configuration and from the embodiment described above.

Figure 10:
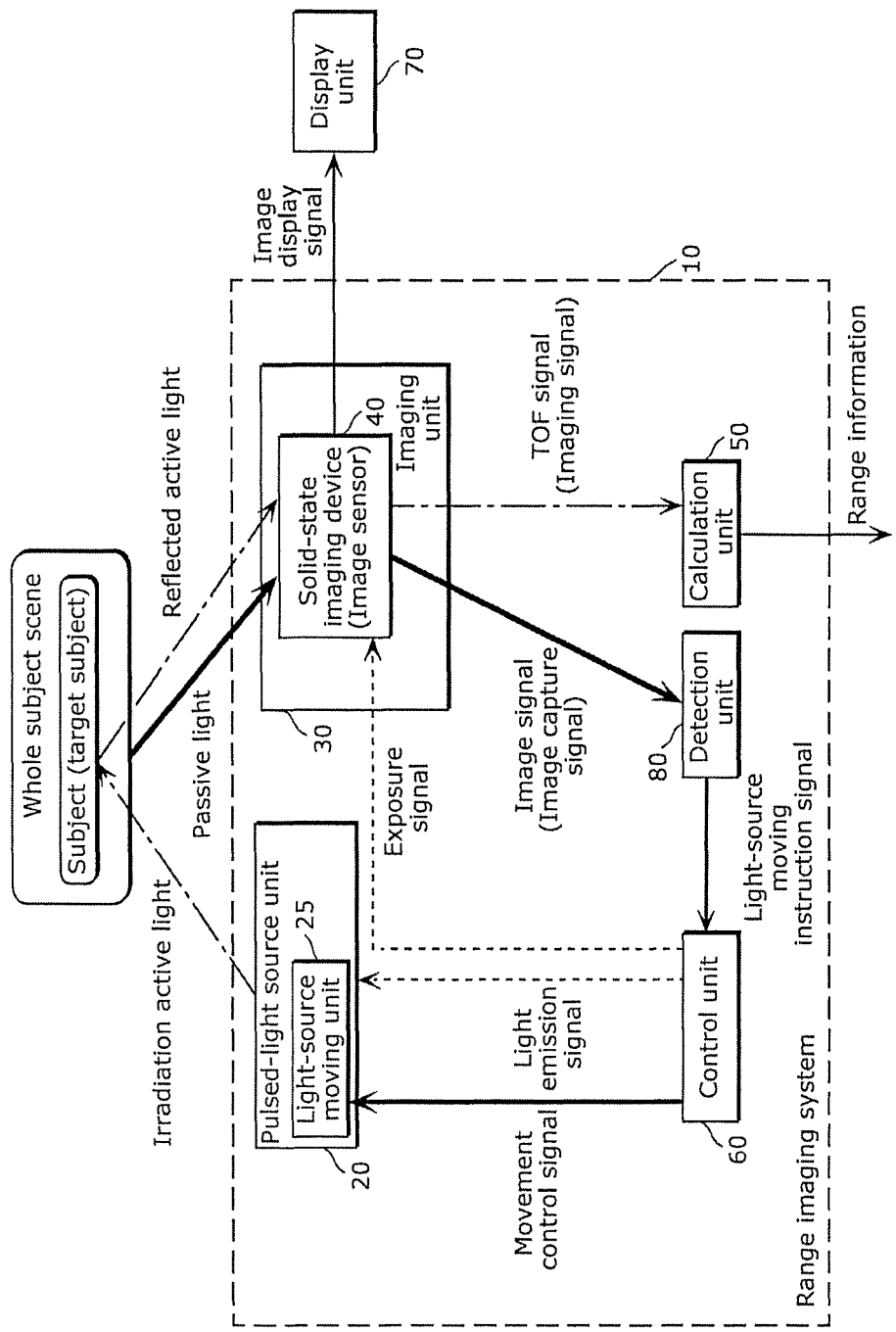
FIG. 10 is a functional block diagram showing a schematic configuration example of a range imaging system according to Embodiment 2.

FIG. 10 is a functional block diagram showing a schematic configuration example of the range imaging system 10 according to Embodiment 2.

Differences from the basic configuration shown in FIG. 1, FIG. 2A to 2C, and FIG. 3 and from the configuration shown in FIG. 4 are mainly explained. More specifically, the range imaging system 10 according to Embodiment 2 includes a detection unit 80 that detects a specific subject, which is to be a ranging target, in the whole subject scene obtained from a passive image signal. On the basis of the detection result, the detection unit 80 instructs a control unit 60 to issue a light emission instruction to a pulsed-light source unit 20.

To be more specific, the detection unit 80 issues a signal for irradiating the subject with the irradiation active light. Receiving this signal, the control unit 60 changes an irradiation direction of the irradiation active light to cause a light-source moving unit 25 in the pulsed-light source unit 20 to irradiate the specific subject with the light. To change the irradiation direction of the irradiation active light, the detection unit 80 may input the signal directly to the pulsed-light source unit 20.

It should be noted that Embodiment 2 includes an example in which some or all of the structural elements included in each of the control unit 60, an imaging unit 30, the detection unit 80, and a calculation unit 50 are integrated into a single chip on a semiconductor substrate.

Next, the following describes details of range calculation of the range imaging system 10 according to Embodiment 2.

First, the detection unit 80 detects a subject that requires ranging from a whole subject scene, using a passive image signal outputted from a solid-state imaging device 40 (passive pixels) receiving passive light. The number of subjects does not need to be one and thus may be more than one.

Next, from detection information on a location of the subject, the detection unit 80 outputs a signal for specifying the direction in which the pulsed-light source unit 20 emits the pulsed light (this signal is referred to as the light-source moving instruction signal) to the pulsed-light source unit 20 (the light-source moving unit 25 in the pulsed-light source unit 20) via the control unit 60. The detection unit 80 may output this light-source moving instruction signal directly to the pulsed-light source unit 20 (the light-source moving unit 25 in the pulsed-light source unit 20) by bypassing the control unit 60.

The pulsed-light source unit 20 irradiates the subject with the irradiation active light. Then, the solid-state imaging device 40 (the active pixels) receives (exposes) the resulting reflected active light, and outputs the TOF signal to the calculation unit 50.

The calculation unit 50 measures (ranges) a distance to the subject using the TOF signal, by the TOF range calculation described above in Embodiment 1.

With the range imaging system 10 according to Embodiment 2 described thus far, the subject subjected to the ranging is detected and the TOF signal is thus outputted, resulting in a reduction in noise components. Hence, the distance to the subject can be measured with high accuracy and at high speed.

Figure 11:
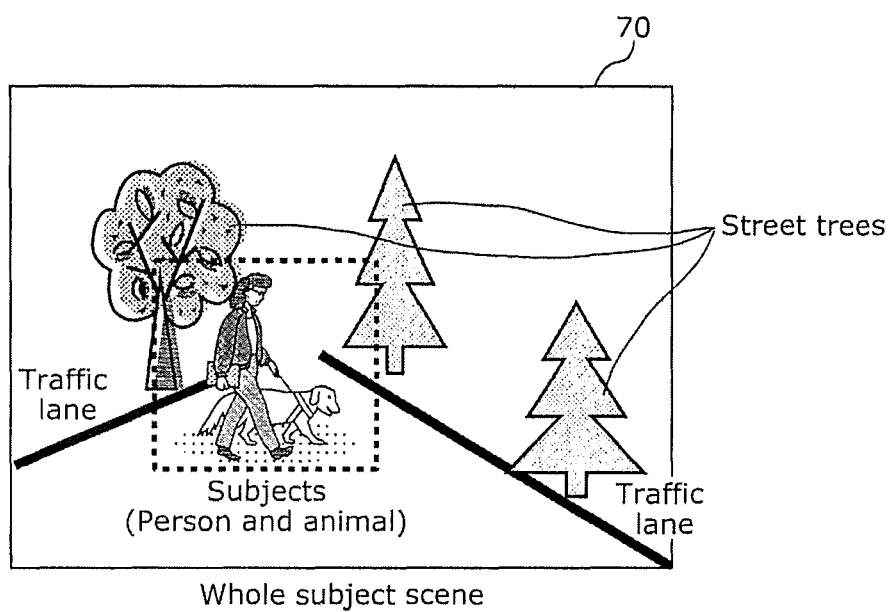
FIG. 11 is a diagram showing an example of a displayed image on a display unit when the range imaging system according to Embodiment 2 is mounted to transportation equipment (a vehicle).

FIG. 11 is a diagram showing an example of a displayed image on a display unit 70 when the range imaging system 10 shown in FIG. 10 is mounted to a vehicle (transportation equipment). In FIG. 11, a scene in front of the vehicle is displayed.

As shown in FIG. 11, a person and an animal crossing a street (roadway) in a traffic lane as well as different kinds of street trees are displayed as a whole subject scene. Note that one of the street trees is located closer to the vehicle than the person and the animal.

The range imaging system 10 according to Embodiment 2 stores (or records) initial information on the subject, i.e., the specific subject, which has a higher priority to be ranged. The range imaging system 10 detects in particular, for example, a person, an animal, or a physical object in the street as the specific subject to be ranged by priority. More specifically, the range imaging system 10 detects such a specific subject from the whole subject scene.

Thus, the imaging time taken by the solid-state imaging device 40 for the reflected active light is reduced and the amount of signal is also reduced. This can achieve, for example, miniaturization of the system, reduction of the measurement time, and low power consumption. Moreover, since the imaging signal represents signal information from the subject (the specific subject), noise components in the imaging signal can be reduced. Therefore, the dimensions of the subject (the specific subject) can be measured with high accuracy.

Figure 12:
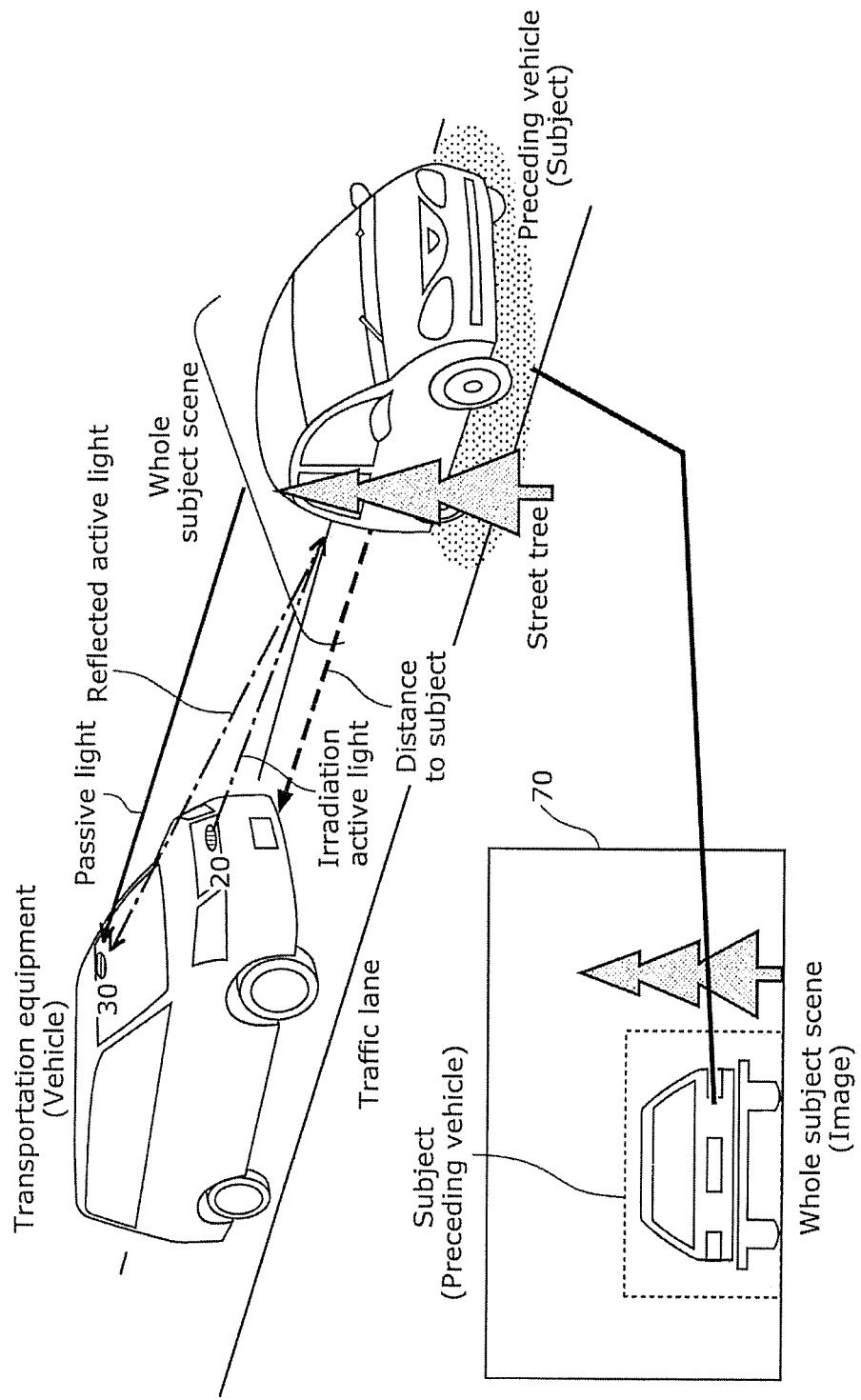
FIG. 12 is a diagram showing a mounting example in which the range imaging system according to Embodiment 2 is mounted to a vehicle, as well as showing an example of a displayed image on the display unit.

FIG. 12 is a diagram showing a mounting example in which the range imaging system 10 shown in FIG. 10 is mounted to a vehicle (transportation equipment), as well as showing an example of a displayed image on the display unit 70. The display unit 70 in FIG. 12 displays a scene in front of the vehicle.

A preceding vehicle and a street tree are displayed as subjects. The range imaging system 10 according to Embodiment 2 stores (or records) initial information on the subject having a higher priority to be ranged. Thus, the range imaging system 10 detects the preceding vehicle by priority. More specifically, the range imaging system 10 detects the subject (the specific subject) from the whole subject scene.

In addition to measuring the distance to the preceding vehicle (the subject), drive control of the vehicle (such as an issue of an alarm or the like, automatic speed control, or automatic stop) may be executed. Such measurement and drive control enables safer driving.

Each of the passive pixels of the solid-state imaging device 40 according to Embodiment 2 outputs an image capture signal as a corresponding R, G, or B component. In other words, the passive pixels output a colored image. On this account, the specific subject can be detected from the whole subject scene not only by its shape but also by a different detection reference.

Figure 13A:
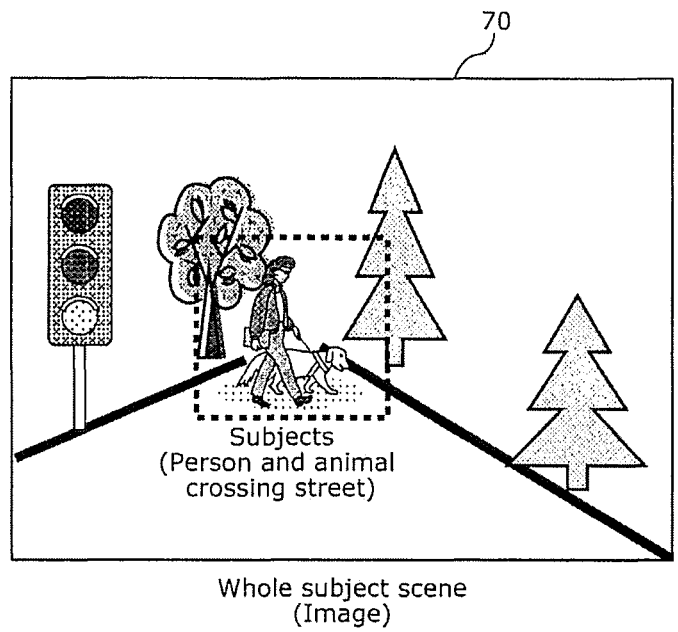
FIG. 13A is an explanatory diagram showing an example of a displayed image on the display unit according to Embodiment 2.
Figure 13B:
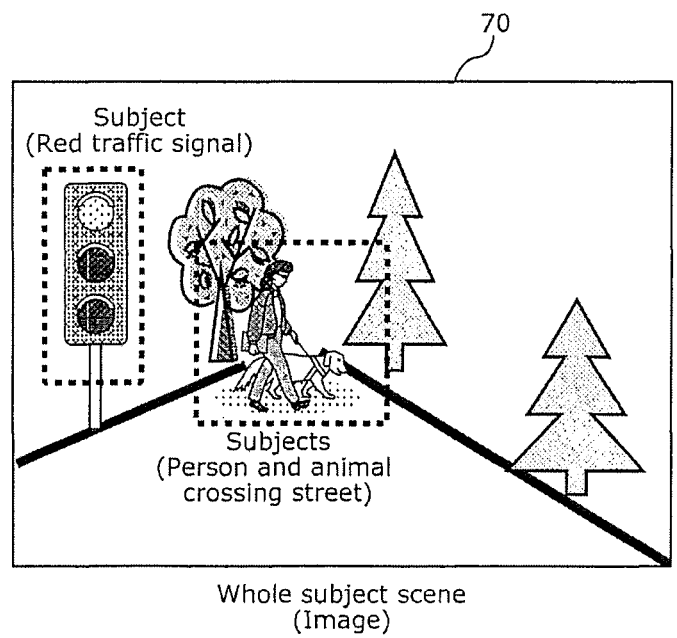
FIG. 13B is an explanatory diagram showing another example of a displayed image on the display unit according to Embodiment 2.

FIG. 13A and FIG. 13B are explanatory diagrams, each showing an example of a displayed image on the display unit 70. As shown in FIG. 13A and FIG. 13B, colors are used as an example of the different detection reference. For example, a traffic light in FIG. 13A is green (a go-ahead indication) and thus may not to be detected as the subject (or, the priority is lowered more than the other subjects). When a traffic light is yellow (a caution indication) or red (a stop indication) as shown in FIG. 13B, the traffic light may be detected as the subject. In this way, advanced detection can be achieved.

It is more preferable that the irradiation active light emitted from the pulsed-light source unit 20 is laser light in the mounting example shown in FIG. 12 as well as when more emphasis is placed on, for example, miniaturization of the range imaging system 10, reduction of the measurement time, and low power consumption.

Although the range imaging system 10 according to Embodiment 2 is mounted for the purpose of making a measurement in front of the vehicle in FIG. 12, the purpose is not limited to this. For example, the range imaging system 10 may be placed near the license plate at the back of the vehicle to make a measurement behind the vehicle. Alternatively, the range imaging system 10 may also be placed on, for example, a sideview mirror to make a measurement on the side of the vehicle.

Although the range imaging system 10 according to Embodiment 2 is mounted for the purpose of making a measurement in front of and outside the vehicle (the system-mounted equipment) in FIG. 12, the purpose is not limited to this. For example, the range imaging system 10 according to Embodiment 2 may be placed inside the vehicle. For instance, a human head may be detected as a subject, and movement (wobble) of the human head may be measured as range information. Such detection and measurement enables the system inside the vehicle to be used to detect, for example, a drowsy driver.

Although the range imaging system 10 according to Embodiment 2 has been described with reference to FIG. 12, the mounting example is not limited to the above in which the range imaging system 10 is mounted to the vehicle. For example, the range imaging system 10 can be mounted to various kinds of equipment and facilities including the following: other transportation equipment (such as a motorcycle, a railroad vehicle, an airplane, and a spacecraft); portable equipment (such as a smartphone, a notebook PC, a tablet PC, portable information equipment, and a portable communication terminal); transportation equipment; infrastructure equipment; heavy equipment (such as a power shovel and a bulldozer); and household equipment.

Embodiment 3

The following describes a configuration and an operation of a range imaging system 10 according to Embodiment 3, with reference to the drawings. Note that the following mainly describes details of differences from Basic Configuration and from the embodiments described above.

Figure 14:
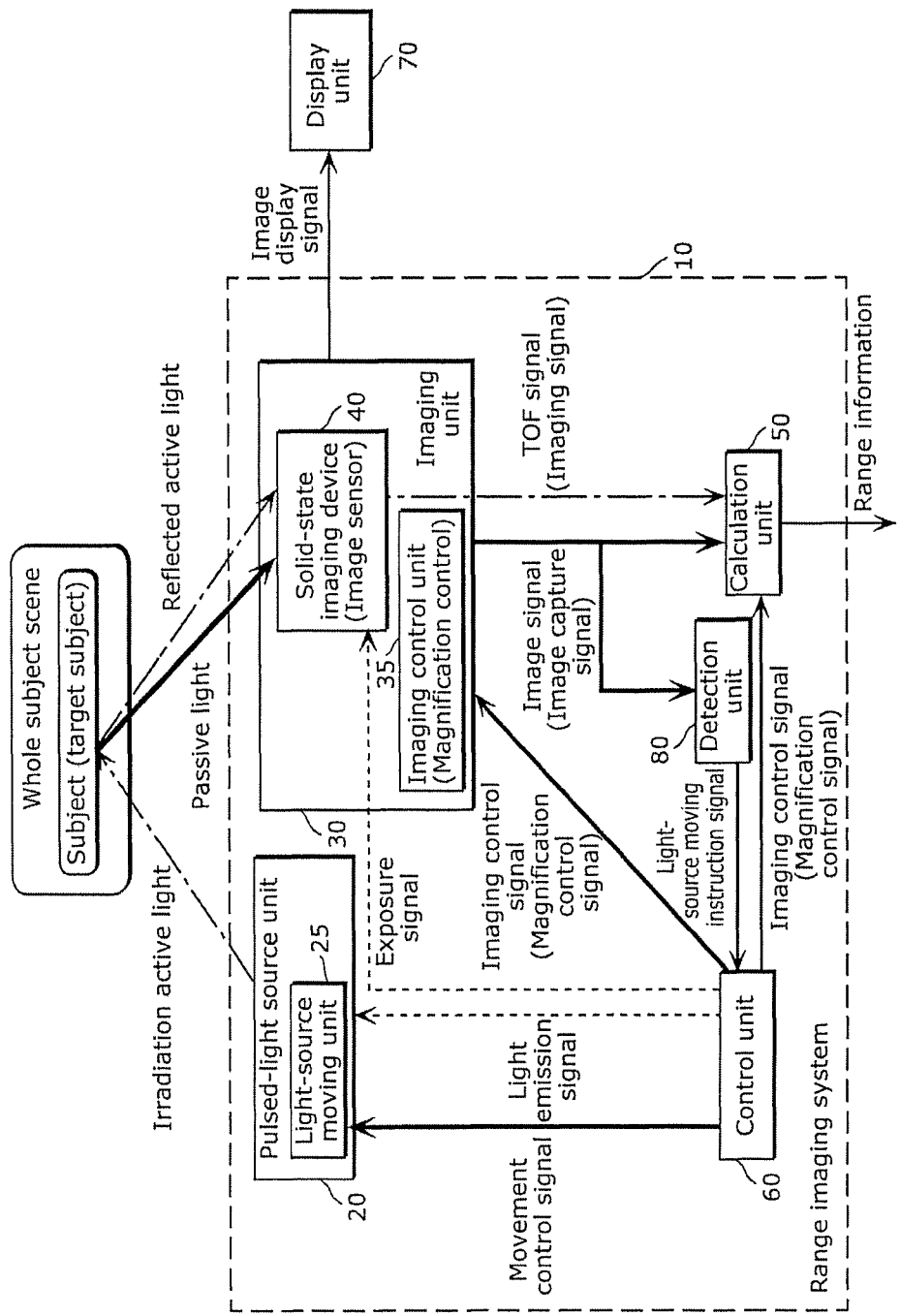
FIG. 14 is a functional block diagram showing a schematic configuration example of a range imaging system according to Embodiment 3.

FIG. 14 is a functional block diagram showing a schematic configuration example of the range imaging system 10 according to Embodiment 3. This range imaging system 10 has both functions described in Embodiments 1 and 2. To be more specific, the range imaging system 10 according to Embodiment 3 can measure the dimensions of a subject with higher accuracy and at a higher speed as well as measuring a distance to the subject.

Figure 15:
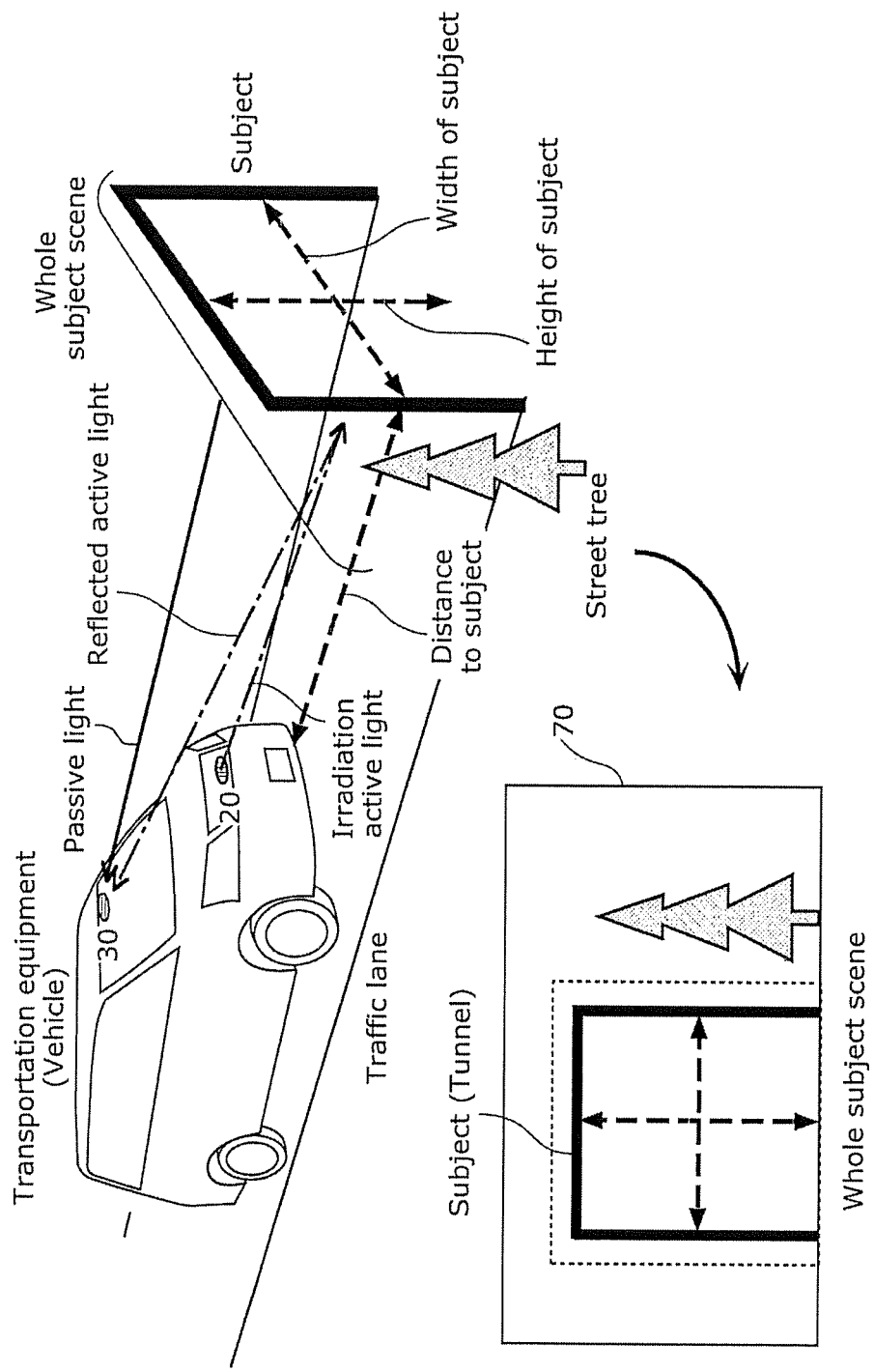
FIG. 15 is a diagram showing a mounting example in which the range imaging system according to Embodiment 3 is mounted to a vehicle, as well as showing an example of a displayed image on a display unit.

FIG. 15 is a diagram showing a mounting example in which the range imaging system 10 shown in FIG. 14 is mounted to a vehicle, as well as showing an example of a displayed image on a display unit 70. In FIG. 15, a scene in front of the vehicle is displayed as an example of the displayed image. Subjects in FIG. 15 include a tunnel and a street tree located near the tunnel. Assume that the vehicle is going to drive through this tunnel.

Next, the following describes details of range calculation of the range imaging system 10 according to Embodiment 3, with reference to FIG. 14 and FIG. 15.

First, a detection unit 80 determines a subject that requires ranging from a whole subject scene, using a passive image signal outputted from a solid-state imaging device 40 (passive pixels) receiving passive light. To be more specific, an image capture signal is outputted from the solid-state imaging device 40 (the passive pixels) that receives the passive light from the subjects to capture an image of (perform imaging on) the whole subject scene including the tunnel and the street tree. Receiving this image capture signal, the detection unit 80 detects the subject.

The range imaging system 10 according to Embodiment 3 stores (or records) initial information on, for example, a type of the subject which has a higher priority to be ranged. When used for automotive application, the range imaging system 10 according to Embodiment 3 detects in particular, for example, a preceding vehicle (such as an automobile, a motorcycle, an electric cycle bicycle, or a bicycle), a person, an animal, or a physical object in the street as the subject to be ranged by priority. More specifically, the range imaging system 10 detects such a subject from the whole subject scene.

In FIG. 15, the tunnel is detected (determined) to have a higher priority in ranging than the street tree located outside the road through which the vehicle is going drive. However, the subject detection is not limited to this example. The system may store (or record) various kinds of initial information, which enables the system to effectively detect the subject with higher accuracy.

Next, having the information on a location of the subject, the detection unit 80 outputs a signal for specifying the direction in which a pulsed-light source unit 20 emits the pulsed light (this signal is referred to as the light-source moving instruction signal) to the pulsed-light source unit 20 (a light-source moving unit 25 in the pulsed-light source unit 20) via a control unit 60. The detection unit 80 may output this light-source moving instruction signal directly to the pulsed-light source unit 20 (the light-source moving unit 25 in the pulsed-light source unit 20) by bypassing the control unit 60.

The pulsed-light source unit 20 irradiates the subject with the pulsed light. Then, the solid-state imaging device 40 (the active pixels) exposes the resulting reflected active light, and outputs a TOF signal to the calculation unit 50.

The calculation unit 50 measures (ranges) a distance to the subject using the TOF signal, by the TOF range calculation described above in Embodiment 1.

Moreover, the calculation unit 50 detects the subject on which the dimensional measurement is to be performed, and calculates a first subject dimension from, for example, a displayed dimension on the display unit 70 and initial values stored (or recorded) in the range imaging system 10. Then, using the calculated first subject dimension and the distance to the subject calculated by the aforementioned TOF range calculation, a dimension of the subject such as the height or width is calculated while, in some cases, calculation correction is performed using the aforementioned image magnification coefficient (the imaging control signal).

By the calculation described above, the range imaging system 10 according to Embodiment 3 can measure the distance to the subject as well as the dimensions of the subject, such as the height and width.

Since a subject having a lower priority is not subjected to ranging in Embodiment 3, the measurement time can be reduced. Moreover, a signal to be possibly a noise component in the ranging of the subject (such as imaging and range information on the street tree shown in FIG. 15) can be reduced. Hence, multiple distances (dimensions) of the subject can be measured with higher precision.

Although the range imaging system 10 according to Embodiment 3 is mounted for the purpose of making a measurement in front of the vehicle in FIG. 15, the purpose is not limited to this.

For example, the range imaging system 10 may be placed near the license plate at the back of the vehicle to make a measurement behind the vehicle. Alternatively, the range imaging system 10 may also be placed on, for example, a sideview mirror to make a measurement on the side of the vehicle.

Although the range imaging system 10 according to Embodiment 3 is mounted for the purpose of making a measurement in front of and outside the vehicle (the system-mounted equipment) in FIG. 15, the purpose is not limited to this. For example, the range imaging system 10 according to Embodiment 3 may be placed inside the vehicle. For instance, a human head may be detected as a subject, and movement (wobble) of the human head may be measured as range information. Such detection and measurement enables the system inside the vehicle to be used to detect, for example, a drowsy driver.

Although the range imaging system 10 according to Embodiment 3 has been described with reference to FIG. 15, the mounting example is not limited to the above in which the range imaging system 10 is mounted to the vehicle. For example, the range imaging system 10 can be mounted to various kinds of equipment and facilities including the following: other transportation equipment (such as a motorcycle, a railroad vehicle, an airplane, and a spacecraft); portable equipment (such as a smartphone, a notebook PC, a tablet PC, portable information equipment, and a portable communication terminal); transportation equipment; infrastructure equipment; heavy equipment (such as a power shovel and a bulldozer); and household equipment.

Embodiment 4

The following describes a configuration and an operation of a range imaging system 10 according to Embodiment 4, with reference to the drawings. Note that the following mainly describes details of differences from Basic Configuration and from the embodiments described above.

Figure 16:
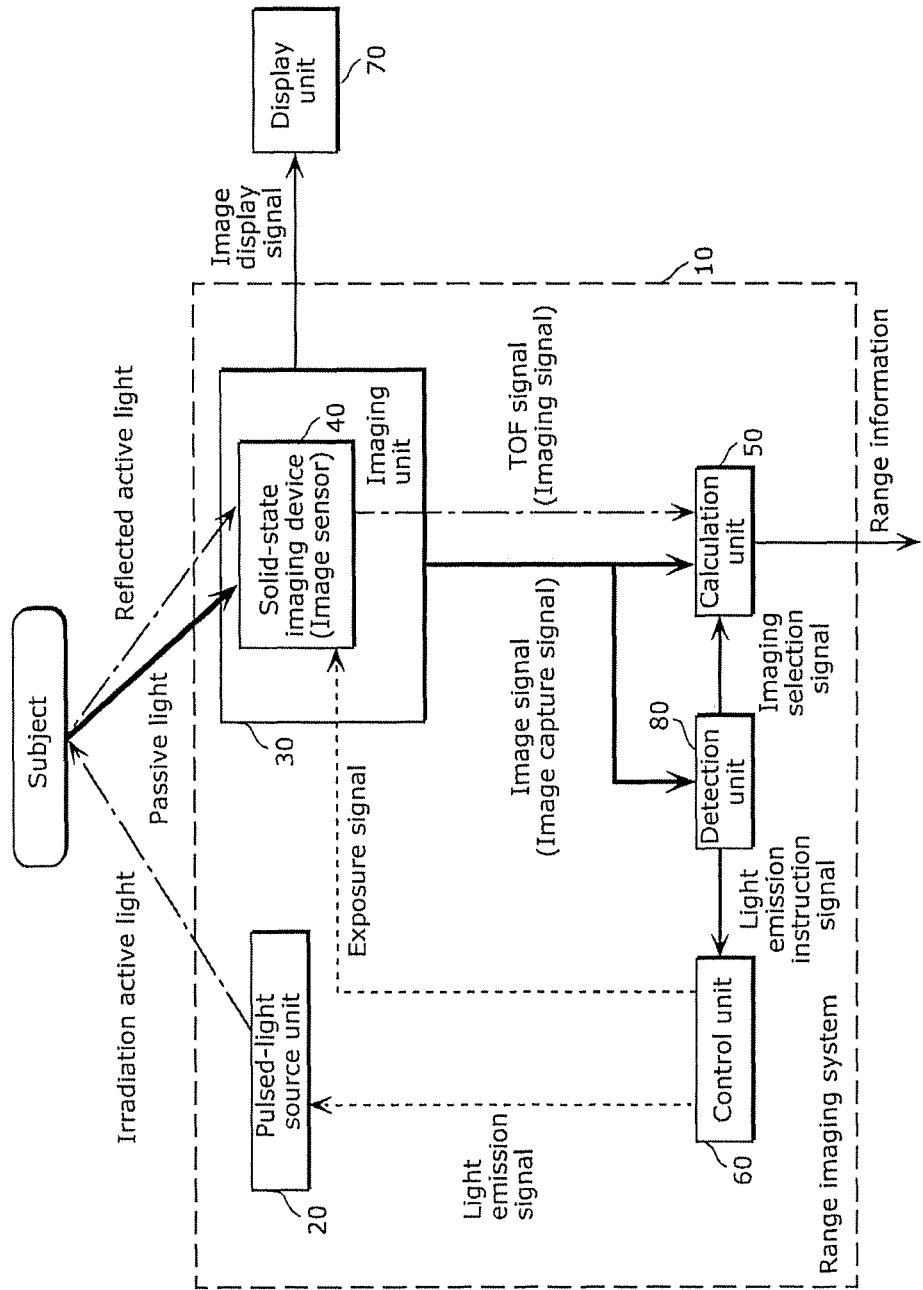
FIG. 16 is a functional block diagram showing a schematic configuration example of a range imaging system according to Embodiment 4.

FIG. 16 is a functional block diagram showing a schematic configuration example of the range imaging system 10 according to Embodiment 4.

First, the range imaging system 10 according to Embodiment 4 performs range calculation directly using an image capture signal (hereinafter, referred to as the image range calculation).

An example of the image range calculation is as follows. A solid-state imaging device 40 (passive pixels) of an imaging unit 30 captures an image sequence and outputs a signal of the image sequence (an image capture signal) to a calculation unit 50. Then, the calculation unit 50 compares a current frame (image) with a preceding frame (image) to derive a distance by calculation.

Under a ranging environment satisfying a predetermined condition in, for example, automotive application (application to transportation equipment), an inter-vehicular distance to a preceding vehicle can be measured every moment by this image range calculation method. Then, a large change in the distance between the frames stored (or recoded) as video is determined to be a sudden approach to the preceding vehicle. Thus, this image range calculation method has the advantage of making such a determination relatively easily.

More specifically, the method has the advantage of measuring the distance to the preceding vehicle with a small amount of calculation.

On the other hand, under a ranging environment not satisfying the condition, the image range calculation method has the disadvantage that the ranging accuracy is significantly reduced (or, that ranging cannot be performed at all). Thus, the range imaging system 10 according to Embodiment 4 is to solve this disadvantage.

The following describes details of the range imaging system 10 according to Embodiment 4 with reference to FIG. 16.

First, a detection unit 80 detects a state of the ranging environment on the basis of a passive image signal outputted from the solid-state imaging device 40 and determines whether the state of the ranging environment satisfies the condition for performing the image range calculation. The details on this determination are described later.

When determining that the state of the ranging environment does not satisfy the condition for performing the image range calculation and that ranging by the image range calculation is difficult, the detection unit 80 issues an instruction signal to a control unit 60 for TOF range calculation.

Receiving the instruction signal from the control unit 60, a pulsed-light source unit 20 irradiates a subject with the pulsed light. Then, the solid-state imaging device 40 (the passive pixels) exposes the resulting reflected active light, and outputs a TOF signal to the calculation unit 50.

Moreover, the detection unit 80 outputs an image control signal to the calculation unit 50. Receiving this instruction signal, the calculation unit 50 measures (ranges) a distance to the subject by the TOF range calculation.

Next, the following describes an example of a condition in which the range imaging system 10 according to Embodiment 4 determines that ranging by the image range calculation is difficult and thus switches the range calculation method.

Figure 17A:
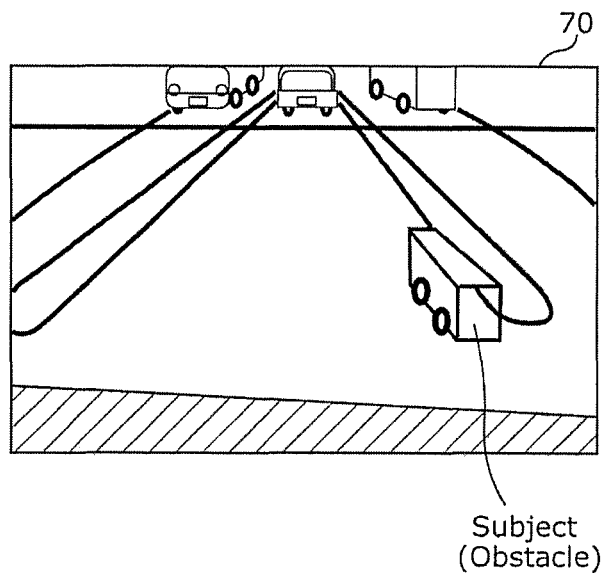
FIG. 17A is a diagram showing an example of a normally captured image when the range imaging system according to Embodiment 4 is mounted to a vehicle.
Figure 17B:
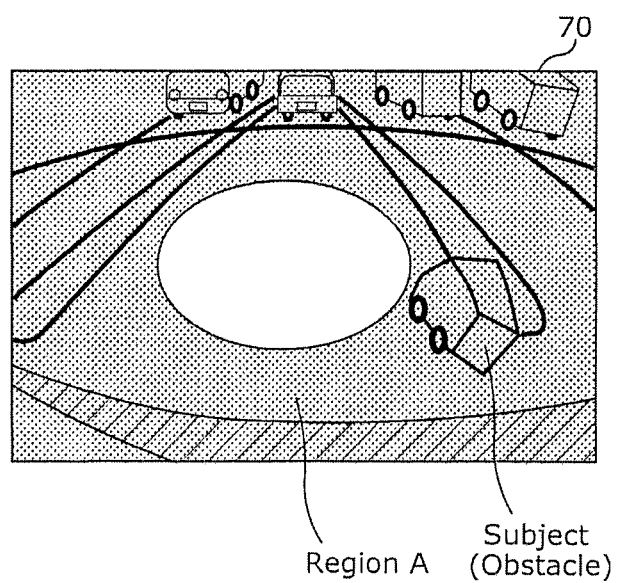
FIG. 17B is a diagram showing an example of a wide angle image when the range imaging system according to Embodiment 4 is mounted to a vehicle.

FIG. 17A and FIG. 17B are diagrams, each showing an example of an image captured according to a passive signal from the solid-state imaging device 40 (the passive pixels) in the case where the range imaging system 10 according to Embodiment 4 is mounted to a vehicle. FIG. 17A shows an example of a normally captured image whereas FIG. 17B shows an example of a wide-angle captured image.

As apparent from FIG. 17B, wide-angle image capture enables imaging of a wider region even when a distance to a subject is short. However, subject distortion occurs to a peripheral region (Region A in FIG. 17B) of a wide-angle captured image.

To be more specific, the subject (obstacle) in FIG. 17A is captured with no image distortion. On the other hand, although the obstacle in FIG. 17B can be recognized, the data including a large distortion make it difficult to measure the distance to the obstacle accurately.

In the case of the image range calculation performed using the aforementioned sequential image capture (the image sequence) in particular, distortion between the images is rendered more excessively. Thus, the error increases in the image range calculation, thereby making it difficult to measure the distance.

With this being the situation, when the subject in Region A of FIG. 17B is subjected to ranging, the TOF range calculation is performed. According to the range imaging system 10 in Embodiment 4, the image signal (image capture signal) and the TOF signal (imaging signal) are outputted from the same device, that is, the solid-state imaging device 40. In other words, the imaging signals from the solid-state imaging device 40, which is a single-plate device, have the same imaging center (optical center or optical axis center). On this account, a phase difference between the imaging signals is small and thus the imaging signals are synchronized more accurately, for example. Hence, with the high compatibility and high correlativity between the range calculation result (range information) by the image range calculation and the calculation result (range information) by the TOF range calculation, ranging can be performed with higher accuracy.

Here, even when including a plurality of solid-state imaging devices (that is, even when the imaging unit 30 is a stereo camera), the range imaging system 10 according to Embodiment 4 can switch the calculation method between the image range calculation and the TOF range calculation.

Moreover, the reason for this selection between the image range calculation and the TOF range calculation is not limited to image distortion. The selection can be made under other conditions as follows.

Figure 18A:
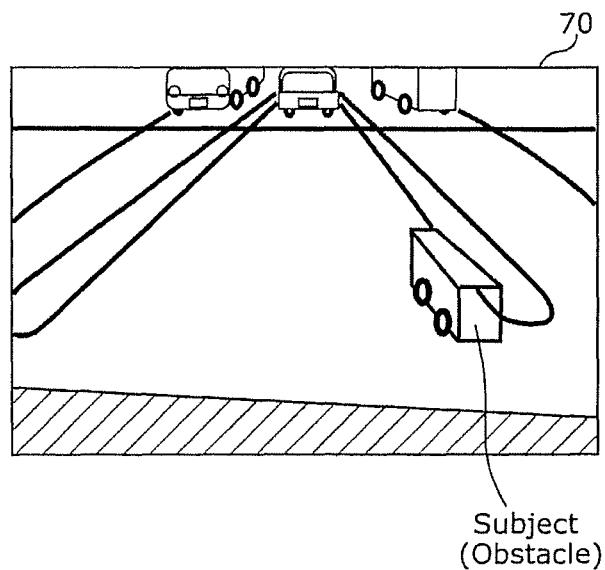
FIG. 18A is a diagram showing an example of an image captured in the daytime when the range imaging system according to Embodiment 4 is mounted to a vehicle.
Figure 18B:
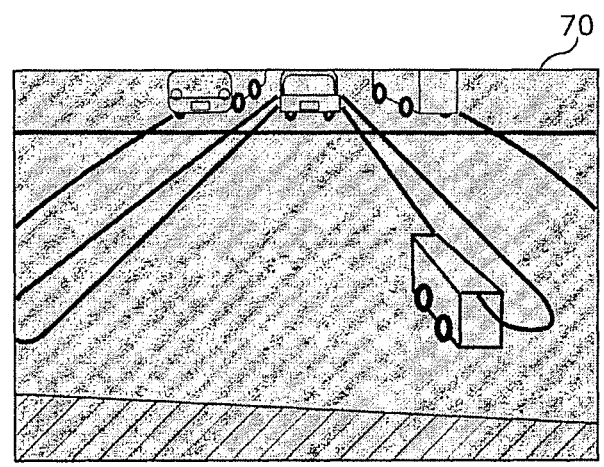
FIG. 18B is a diagram showing an example of an image captured in the late afternoon or nighttime when the range imaging system according to Embodiment 4 is mounted to a vehicle.

A first example is to select between the image capture signal and the imaging signal depending on the time of day or night. FIG. 18A and FIG. 18B are diagrams, each showing an example of a captured image obtained when the range imaging system 10 according to Embodiment 4 is mounted to a vehicle. FIG. 18A shows an example of an image captured in the daytime whereas FIG. 18B shows an example of an image captured in the late afternoon or nighttime.

In the daytime as shown in FIG. 18A, for example, ranging is performed using the image range calculation according to Embodiment 4. On the other hand, when a clear image cannot be captured because of, for example, the nighttime as shown in FIG. 18B, ranging is performed using the TOF range calculation. Thus, ranging can be performed with accuracy regardless of any time of day or night.

A second example is to select between the image capture signal and the imaging signal depending on a weather or environmental condition. For example, when the system is exposed to the strong afternoon sunshine or the like or when it rains (that is, when image recognition is difficult), the TOF range calculation is used. In an environment other than this, the image range calculation is used. Thus, ranging can be performed with high accuracy regardless of any weather or environmental conditions.

A third example is to select between the image capture signal and the imaging signal depending on a distance to the subject. More specifically, the TOF range calculation is used for a short distance that is likely to result in a wide angle image, and the image range calculation is mainly used for a middle or long distance. Thus, ranging can be performed with high accuracy regardless of any distance to the subject.

A fourth example is to select between the image capture signal and the imaging signal depending on transportation equipment (such as a vehicle) including the present system or on a motion speed of the subject. It is more preferable to use the TOF range calculation when, for example, the transportation equipment moves at high speed, such as 100 km/h or more.

According to Embodiment 4, the image capture signal or the imaging signal is selected depending on the state of the ranging environment. However, the present disclosure is not limited to this. For example, to make the calculation result (the ranging result) based on one signal accurate, the other signal may be used for correction depending on the state of the ranging environment.

For example, in the fourth example above, when the transportation equipment moves at low speed such as 30 km/h or less, either the result of the TOF range calculation or the result of the image range calculation is used as interpolation information to calculate a final distance. Moreover, at medium speed between, for example, 30 km/h and 100 km/h, the TOF range calculation or the image range calculation is used depending on an individual frame. Furthermore, at high speed such as 100 km/h or more, the TOF range calculation is used. Thus, ranging can be performed with high accuracy regardless of any distance to the subject.

Embodiment 5

The following describes a configuration and an operation of a range imaging system 10 according to Embodiment 5, with reference to the drawings. Note that the following mainly describes details of differences from Basic Configuration and from the embodiments described above.

Figure 19:
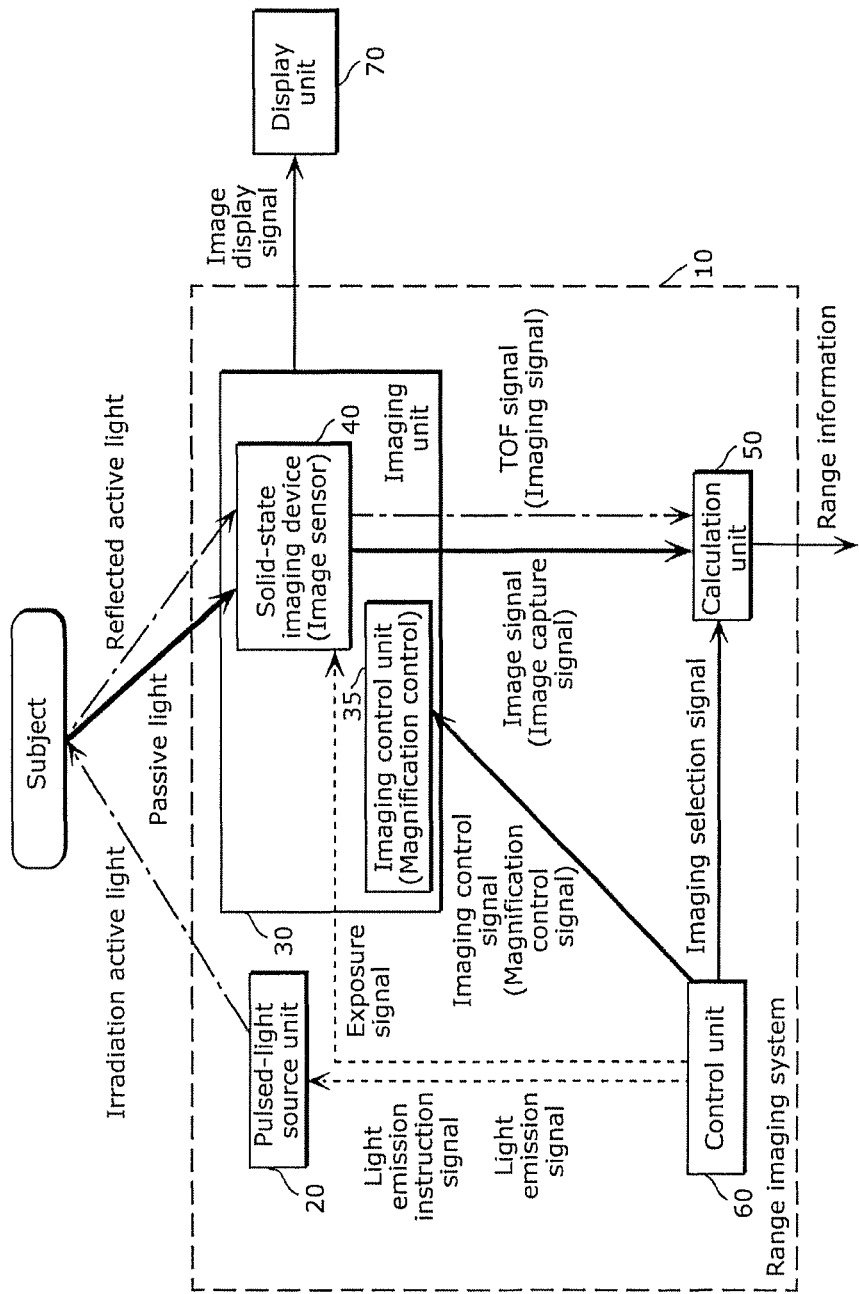
FIG. 19 is a functional block diagram showing a schematic configuration example of a range imaging system according to Embodiment 5.

FIG. 19 is a functional block diagram showing a schematic configuration example of the range imaging system 10 according to Embodiment 5. As a difference from Embodiment 4 (FIG. 16), the range imaging system 10 according to Embodiment 5 does not include a detection unit 80. Instead, an initial value indicating a condition (a selection condition) to switch between the TOF range calculation and the image range calculation is previously stored (or recorded) in the range imaging system 10. Thus, the range calculation is switched on the basis of an imaging condition and the initial value.

FIG. 19 shows an example in which the determination is made on the basis of magnification control by reference to the initial value. In the case of a wide angle imaging, the range calculation is switched according to an image selection signal without detection of a passive signal.

This case does not require a time for detecting the image capture signal and thereby further reduces a time for outputting imaging information as compared with Embodiment 4. That is, the advantage is that ranging can be performed in a short time.

Moreover, the reason for this selection between the image range calculation and the TOF range calculation is not limited to image distortion. The selection can be made under other conditions as follows.

For example, a time of day may be used as the initial value. In such a case, ranging may be performed using the TOF range calculation when it grows dark around the system. As an example, a time period from 8:00 p.m. to 3:00 a.m. may be set as the nighttime. It is preferable that the initial value for this nighttime is set in more detail according to the season, such as summer or winter, or according to the geographic region.

Embodiment 6

The following describes a configuration and an operation of a range imaging system 10 according to Embodiment 6, with reference to the drawings. Note that the following mainly describes details of differences from Basic Configuration and from the embodiments described above.

Figure 20:
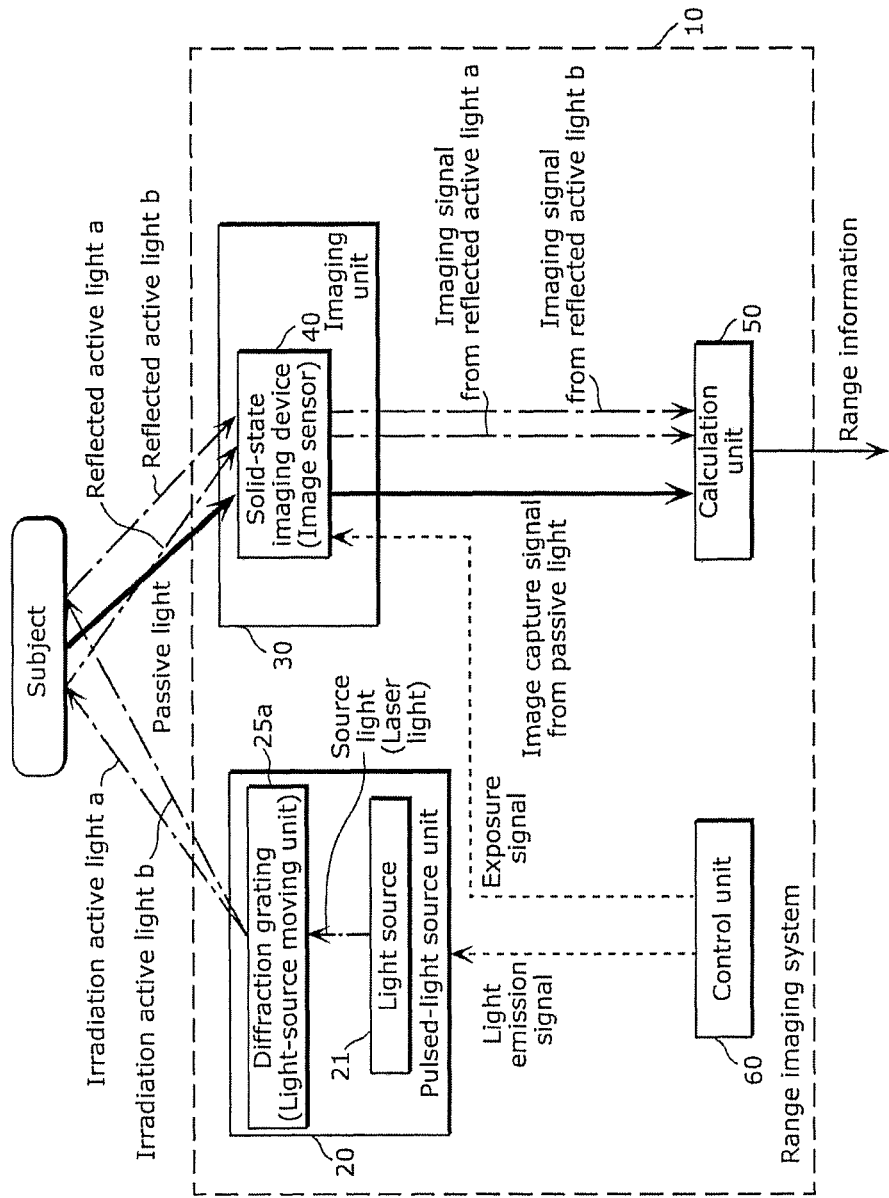
FIG. 20 is a functional block diagram showing a schematic configuration example of a range imaging system according to Embodiment 6.

FIG. 20 is a functional block diagram showing a schematic configuration example of the range imaging system 10 according to Embodiment 6.

As a difference from the basic configuration shown in FIG. 1, a pulsed-light source unit 20 of the range imaging system 10 according to Embodiment 6 includes the following: a light source 21 that emits source light (laser light as an example); and a diffraction grating 25a (a light-source moving unit) that divides the source light into a plurality of irradiation active light beams (irradiation active light a and irradiation active light b in FIG. 20).

It should be noted that light-source moving performed in the light-source moving unit shown in FIG. 20 includes the following cases: a case where the light source 21 or the pulsed-light source unit 20 itself is moved to change the irradiation direction of the source light or the irradiation active light; a case where one of light sources 21 (light sources 21a and 21b shown in FIG. 26B) included in the pulsed-light source unit 20 is selected to change the irradiation direction of the irradiation active light; a case where the irradiation direction of the irradiation active light is changed while the source light is being divided by the diffraction grating 25a; a case where the irradiation direction of the irradiation active light is changed using the diffraction grating 25a and a galvanometer; a case where the light divided by the diffraction grating 25a changes the irradiation direction of the irradiation active light by means of a reflector (or a reflector mounted on a rotating shaft of the galvanometer); a case where one of the light sources 21a and 21b (FIG. 26B) included in the pulsed-light source unit 20 and/or one of the diffraction gratings 25a and 25b (FIG. 26A and FIG. 26B) included in the pulsed-light source unit 20 is selected to change the irradiation direction of the irradiation active light; and a case where the above cases are combined. Note that the light-source moving is not limited to the above cases.

To facilitate understanding of the present disclosure, the two irradiation active light beams are shown in FIG. 20. However, the number of the irradiation active light beams is not limited to this, and the source light may be divided into a larger number of irradiation active light beams.

According to the exposure signal, the pulsed-light source unit 20 emits the irradiation active light beams, which are then reflected off the subject. A solid-state imaging device 40 receives a plurality of resulting reflected active light beams (reflected active light a and reflected active light b in FIG. 20) and outputs an imaging signal.

In FIG. 20, since the source light is laser light, which is superior in rectilinearity, the diffraction grating 25a can efficiently divide the source light.

Figure 21:
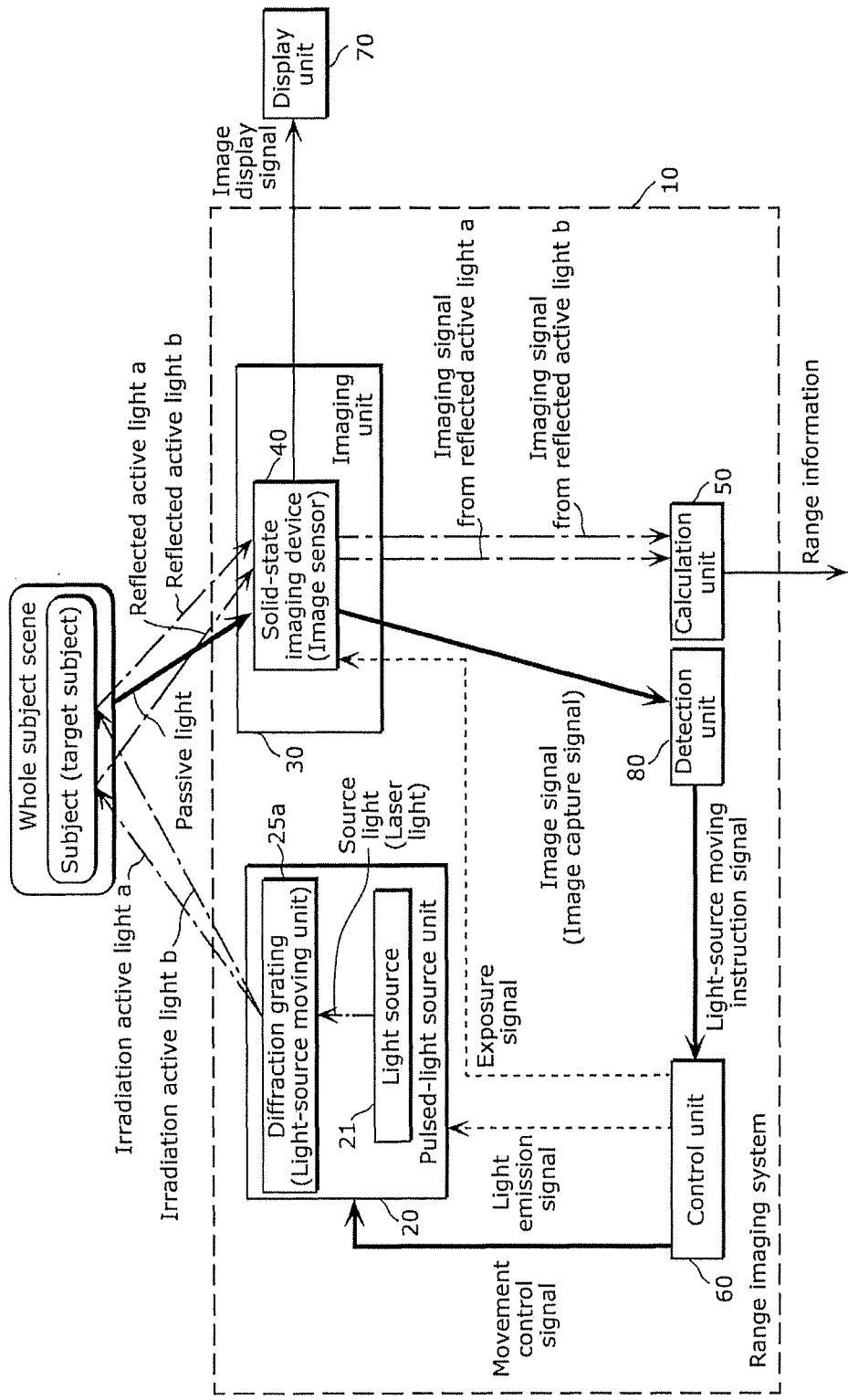
FIG. 21 is a detailed structure diagram showing an example in which a pulsed-light source unit having a diffraction grating according to Embodiment 6 is applied to the range imaging system shown in FIG. 10.

FIG. 21 is a detailed structure diagram showing an example in which the pulsed-light source unit 20 having the diffraction grating 25a is applied to the range imaging system 10 shown in FIG. 10. It should be noted that Embodiment 6 can also be applied to the range imaging system 10 shown in FIG. 4, FIG. 14, FIG. 16, and FIG. 19.

In FIG. 21, a detection unit 80 firstly detects (specifies) a subject that requires ranging from a whole subject scene, using a passive image signal outputted from the solid-state imaging device 40 (the passive pixels) receiving passive light.

Next, from detection information on a location of the subject, the detection unit 80 outputs a light-source moving instruction signal as a movement control signal to the pulsed-light source unit 20 via the control unit 60. This light-source moving instruction signal is used for specifying the direction in which the pulsed-light source unit 20 emits the irradiation active light, the arrangement of irradiation points, or the shape of the irradiation active light. The detection unit 80 may output the light-source moving instruction signal in place of the moving control signal and the light emission signal shown in FIG. 21, directly to the pulsed-light source unit 20 by bypassing the control unit 60.

While causing the diffraction grating 25a (the light-source moving unit) to divide the source light, the pulsed-light source unit 20 changes the irradiation direction of the irradiation active light, the arrangement of irradiation points, or the shape of the irradiation active light. Then, the pulsed-light source unit 20 irradiates the subject with the irradiation active light beams. The solid-state imaging device 40 (the active pixels) receives (exposes) the resulting reflected active light beams, and outputs a TOF signal (imaging signal) to the calculation unit 50.

The calculation unit 50 measures (ranges) a distance to the subject using the TOF signal, by the TOF range calculation described above in Embodiment 1.

It should be noted that a method other than the aforementioned TOF method can be used in Embodiment 6 as in the embodiments described above. As an example, a pattern irradiation method can be used, by which the subject is irradiated with the irradiation active light and then range calculation is performed using distortion of the resulting reflected active light. In Embodiment 6 in particular, since the irradiation active light beams are emitted to the plurality of irradiation points, the pattern irradiation method is especially suited in addition to the TOF method.

The range imaging system 10 according to Embodiment 6 described thus far has the following advantages.

A first advantage is that the irradiation active light can reach the subject located away from the range imaging system 10 without attenuating the overall output of the source light (laser light). To be more specific, as compared with the case where the source light is not divided using a light source having the same light output as the light source 21, a measureable distance (i.e., a distance that the irradiation active light can reach) can be significantly extended without upsizing the range imaging system or increasing power consumption.

A second advantage is that the use of the reflected light (the reflected active light) from a part of the subject enables the obtainment of an amount of signal sufficient to measure a distance to the subject and also enables the reduction in the amount of signal for each individual reflected active light beam. Thus, high-speed range calculation (reduced calculation time) can be achieved.

A third advantage is that an amount of signal sufficient to measure a distance to the subject can be obtained while a signal as a noise component can be reduced. Thus, the accuracy of the distance measurement can be improved.

Lastly, a fourth advantage is that because of the irradiation by the plurality of irradiation active light beams, the range imaging system shown 10 in FIG. 21 in particular does not require an extremely high accuracy to specify the subject (as the image recognition accuracy). Therefore, miniaturization and low cost of the range imaging system, for example, can be easily achieved.

Figure 22:
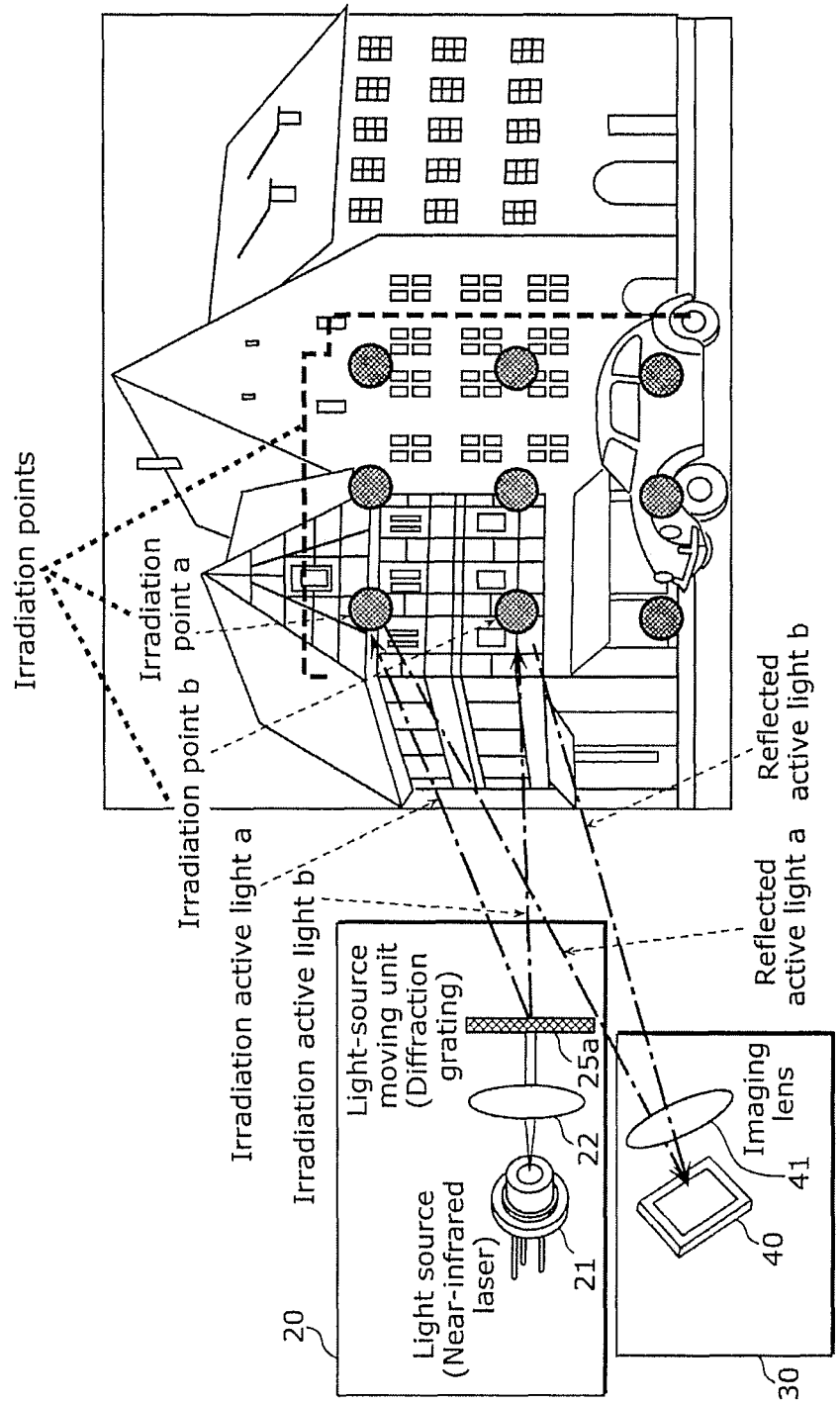
FIG. 22 is a schematic diagram showing an example in which the range imaging system shown in FIG. 20 or FIG. 21 according to Embodiment 6 is mounted to a vehicle (transportation equipment).

FIG. 22 is a schematic diagram showing an example in which the range imaging system 10 shown in FIG. 20 or FIG. 21 is mounted to a vehicle (transportation equipment). To facilitate understanding of Embodiment 6, FIG. 22 shows that only the irradiation active light a and b reach irradiation points a and b among irradiation points (nine irradiation points in FIG. 22) and then resulting reflected active light a and b reach the imaging unit 30 (the solid-state imaging device 40). However, in reality, the irradiation active light beams reach all the irradiation points and the resulting reflected active light beams reach the imaging unit 30 (the solid-state imaging device 40).

Moreover, the pulsed-light source unit 20 may include a collimating lens 22 between the light source 21 and the light-source moving unit (the diffraction grating 25a), as shown in FIG. 22. Furthermore, the imaging unit 30 may include an imaging lens 41 in front of the solid-state imaging device 40.

By irradiating the vehicle as well as the buildings behind the vehicle as the subjects with the divided irradiation active light beams as shown in FIG. 22, each of distances to the vehicle and the buildings can be measured according to Embodiment 6.

To be more specific, after the detection of the subject (the specific subject) from the whole subject scene, a region including the subject (the specific subject) is irradiated, as a center region, with the irradiation active light beams. With this, each of the distances to the specific subject and to the surroundings can be measured.

Figure 23:
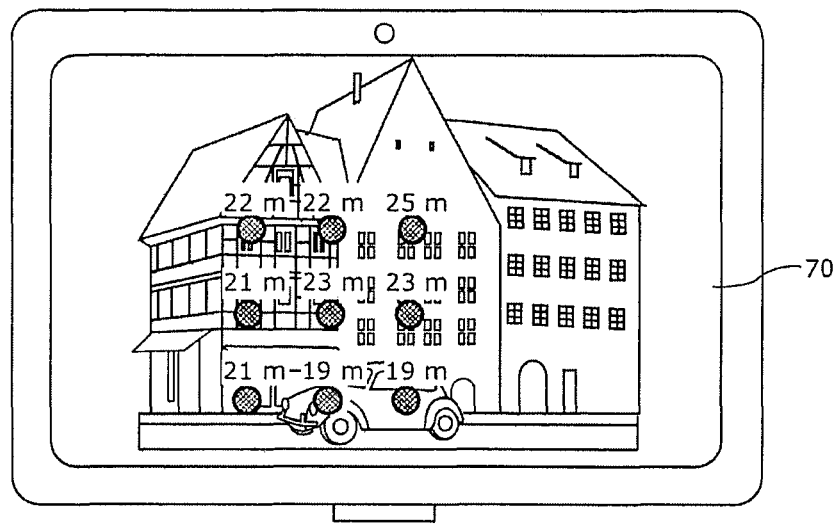
FIG. 23 is a diagram showing an example of screen display of a display unit according to Embodiment 6.

A display unit 70 according to Embodiment 6 may display where in the subject the irradiation active light beams from the pulsed-light source unit 20 are emitted, as in FIG. 23 showing an example of screen display of the display unit 70. In this example of screen display in FIG. 23, marks indicating the irradiation points of the irradiation active light beams emitted to the subject are displayed. Moreover, as shown in FIG. 23, the display unit 70 may display each of the distances to the irradiation points (indicated by circles in FIG. 23). When the distance becomes shorter, the state of the displayed distance may be changed as follows, for example: the color of the displayed distance may be changed; the displayed distance may blink; or an alarm or the like may be issued in addition to displaying the distance. With this, a driver (an operator) driving (operating) the vehicle (the transportation equipment) provided with the range imaging system 10 can be visually reminded of a danger.

Next, the following describes details on an example of the arrangement of the irradiation points, with reference to FIG. 24A, FIG. 24B, FIG. 25A, and FIG. 25B.

Figure 24A:
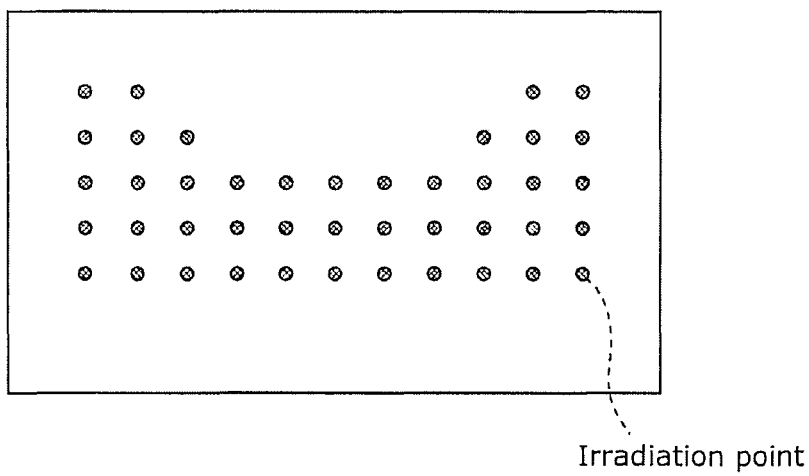
FIG. 24A is a diagram showing an example of arrangement of irradiation points of a plurality of irradiation active light beams according to Embodiment 6.

FIG. 24A is a diagram showing an example of the arrangement in which the center of the irradiation region of the irradiation active light beams has a small number of irradiation points while the periphery of the irradiation region has a large number of irradiation points. This example of the arrangement is preferable particularly in the case where the vehicle (the transportation equipment) provided with the range imaging system 10 according to Embodiment 6 is currently moving and prioritizes the preceding object (the subject such as the preceding vehicle) and the surrounding objects in the distance measurement. More specifically, the range imaging system 10 can efficiently measure the following: a distance to another vehicle (the preceding vehicle in FIG. 24B) which is the subject travelling in front and located relatively far away; and a distance to the subject (the traffic light in FIG. 25B) located near a road.

Figure 25A:
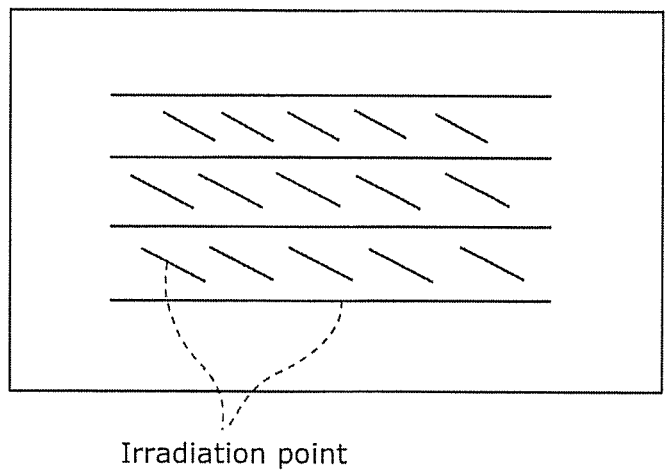
FIG. 25A is a diagram showing another example of arrangement of linear irradiation points of a plurality of irradiation active light beams according to Embodiment 6.
Figure 25B:
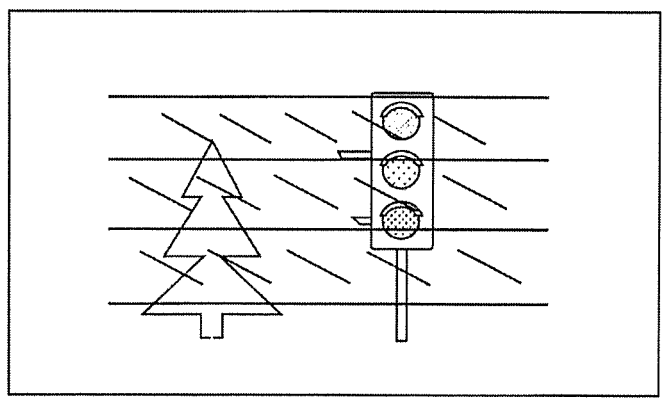
FIG. 25B is a diagram showing another example of arrangement of linear irradiation points of a plurality of irradiation active light beams as well as showing target subjects, according to Embodiment 6.

FIG. 25B is a diagram showing an example of the arrangement in which the divided irradiation active light beams are emitted as lines instead of spots. The shape of the irradiation active light (the laser light) can be changed using, as an example, a line lens mentioned above. In this case, a distance to the subject that is relatively long horizontally or vertically in shape (in dimension), such as the traffic light or the street tree in FIG. 25B, can be measured accurately.

Figure 24B:
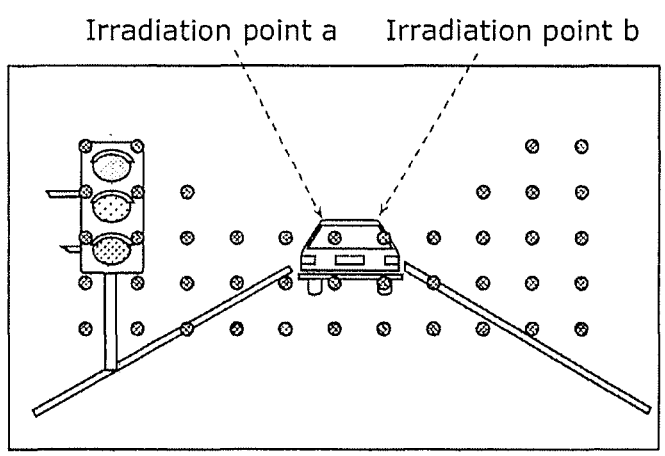
FIG. 24B is a diagram showing an example of arrangement of irradiation points of a plurality of irradiation active light beams as well as showing a subject, according to Embodiment 6.

According to Embodiment 6, the shape of the irradiation active light may be a combination of a spot shape as shown in FIG. 24A and FIG. 24B and a linear shape as shown in FIG. 25A and FIG. 25B. Alternatively, the irradiation active light may have a different shape.

In the range imaging system 10 shown in FIG. 21, the detection unit 80 can detect (specify) the subject using the passive image signal outputted from the solid-state imaging device 40 (the passive pixels) receiving the passive light, and output the signal (the movement control signal) based on the detection information to the pulsed-light source unit 20. This movement control signal is used for determining (selecting) the direction of the irradiation active light, the arrangement of the irradiation points, or the shapes of the irradiation active light beams.

The arrangement of the irradiation points or the shapes of the laser light beams can be changed using a single diffraction grating. As another method, a plurality of diffraction gratings may be provided as shown by the diffraction gratings 25a and 25b in FIG. 26A, which are selected as appropriate. As an example, such a change in the arrangement or shapes can be achieved by physically moving the light source 21, the diffraction grating 25a, or the diffraction grating 25b.

Figure 26A:
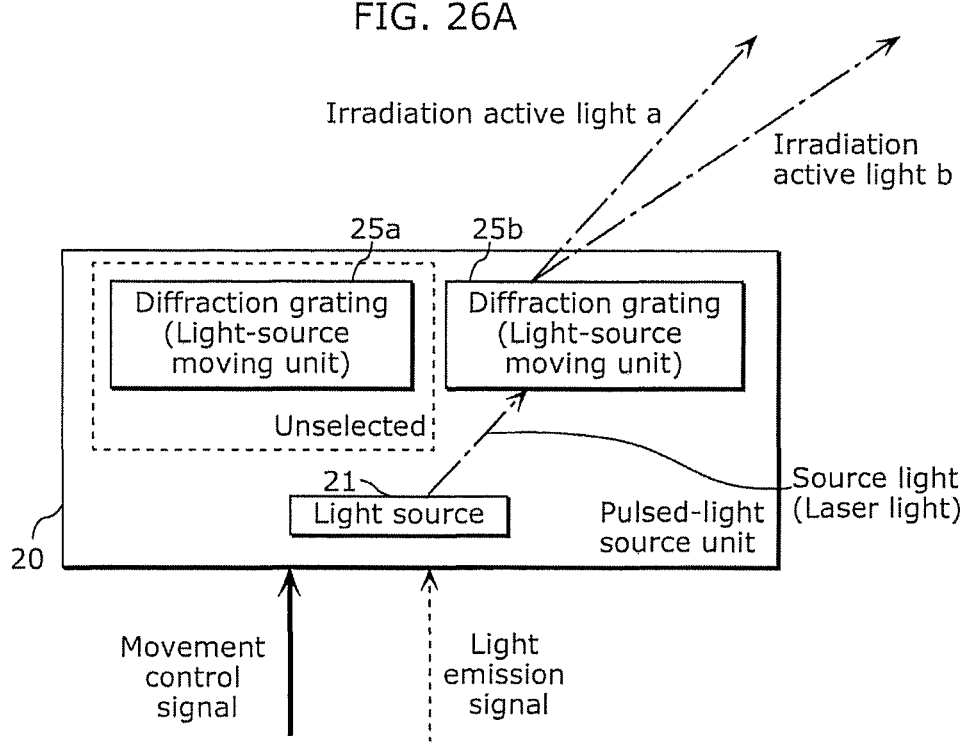
FIG. 26A is a diagram showing an example of a pulsed-light source unit that changes the arrangement of irradiation points or the shape of a laser light beam, according to Embodiment 6.
Figure 26B:
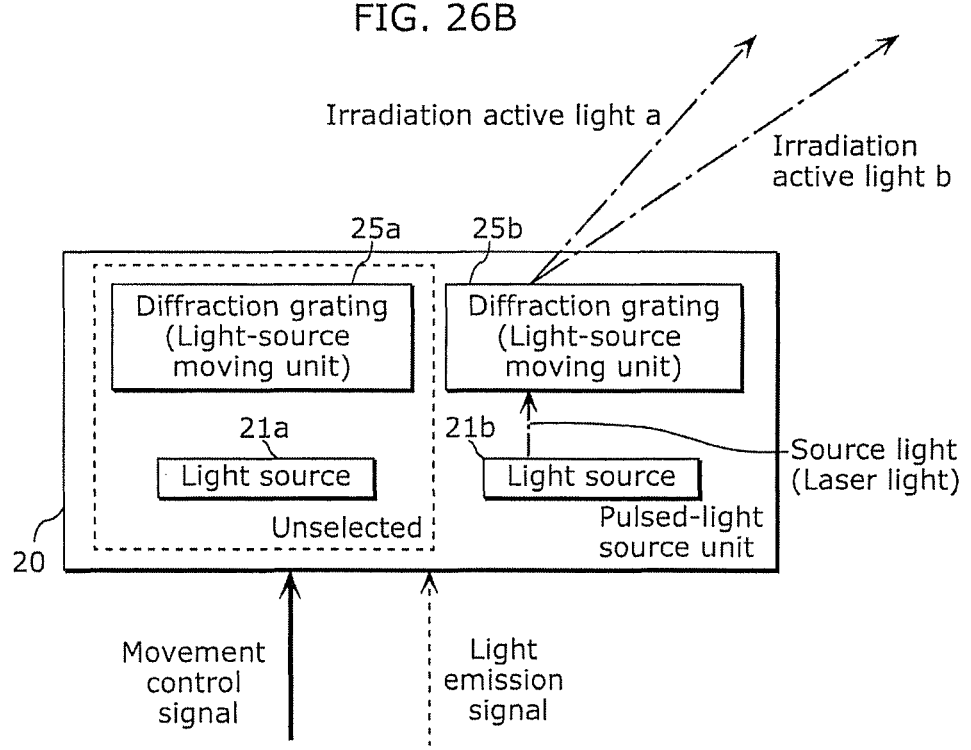
FIG. 26B is a diagram showing another example of the pulsed-light source unit that changes the arrangement of irradiation points or the shape of a laser light beam, according to Embodiment 6.

Alternatively, from among the plurality of diffraction gratings such as the diffraction gratings 25a and 25b in FIG. 26B and the plurality of corresponding light sources such as the light sources 21a and 21b in FIG. 26B, the target light source and the corresponding diffraction grating may be selected. This case has the advantage that the light source and the diffraction grating do not need to be physically moved.

In FIG. 26A and FIG. 26B, according to the aforementioned selection, the subject can be detected using the passive image signal outputted from the solid-state imaging device 40 (the passive pixels) receiving the passive light. On the basis of the detection information received as the movement control signal, the arrangement change of the irradiation points or the shape change of the irradiation active light beams can be determined (selected).

Figure 27:
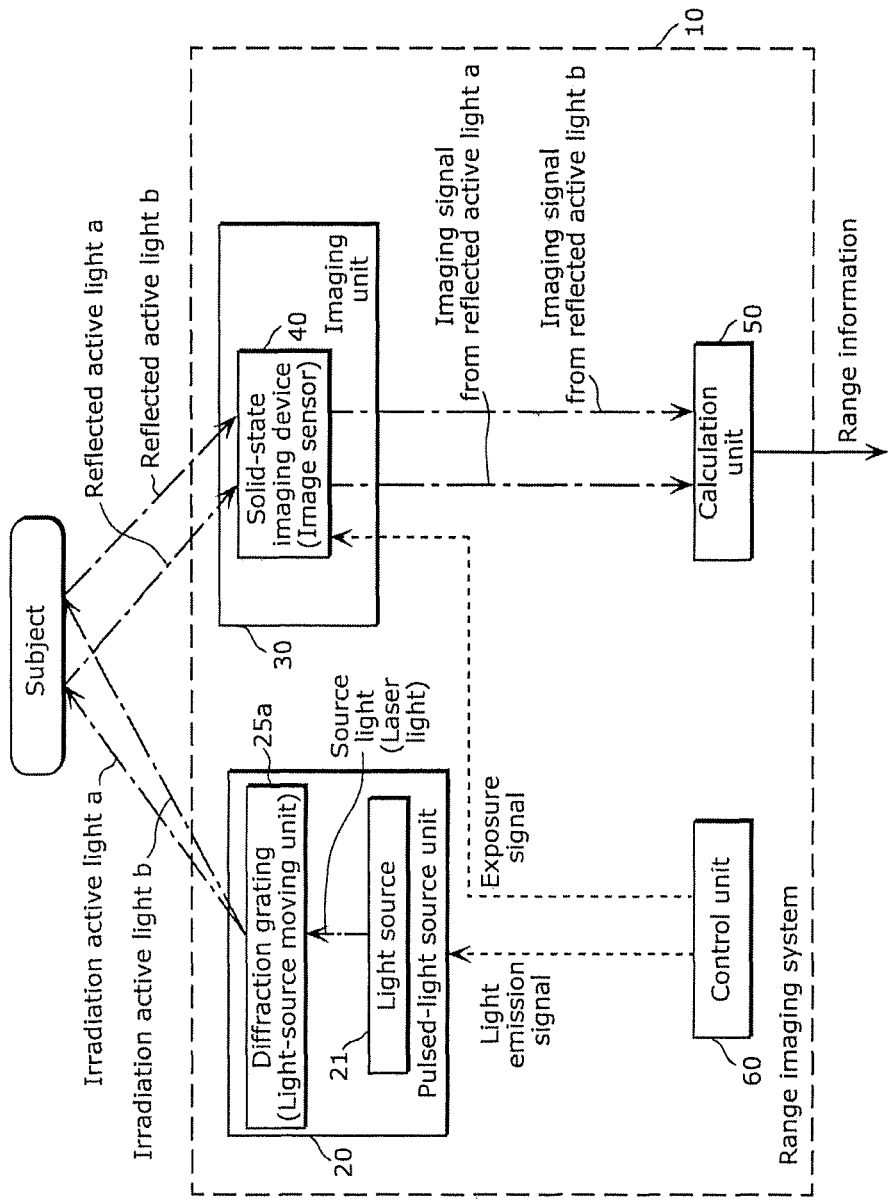
FIG. 27 is a functional block diagram showing a schematic configuration example of a range imaging system according to Embodiment 6.

The range imaging system 10 according to Embodiment 6 described thus far with reference to the drawings may have a configuration in which only the imaging signal is outputted from the imaging unit 30 (the solid-state imaging device 40) as shown in FIG. 27.

Modification 1 of Embodiment 6

Figure 28:
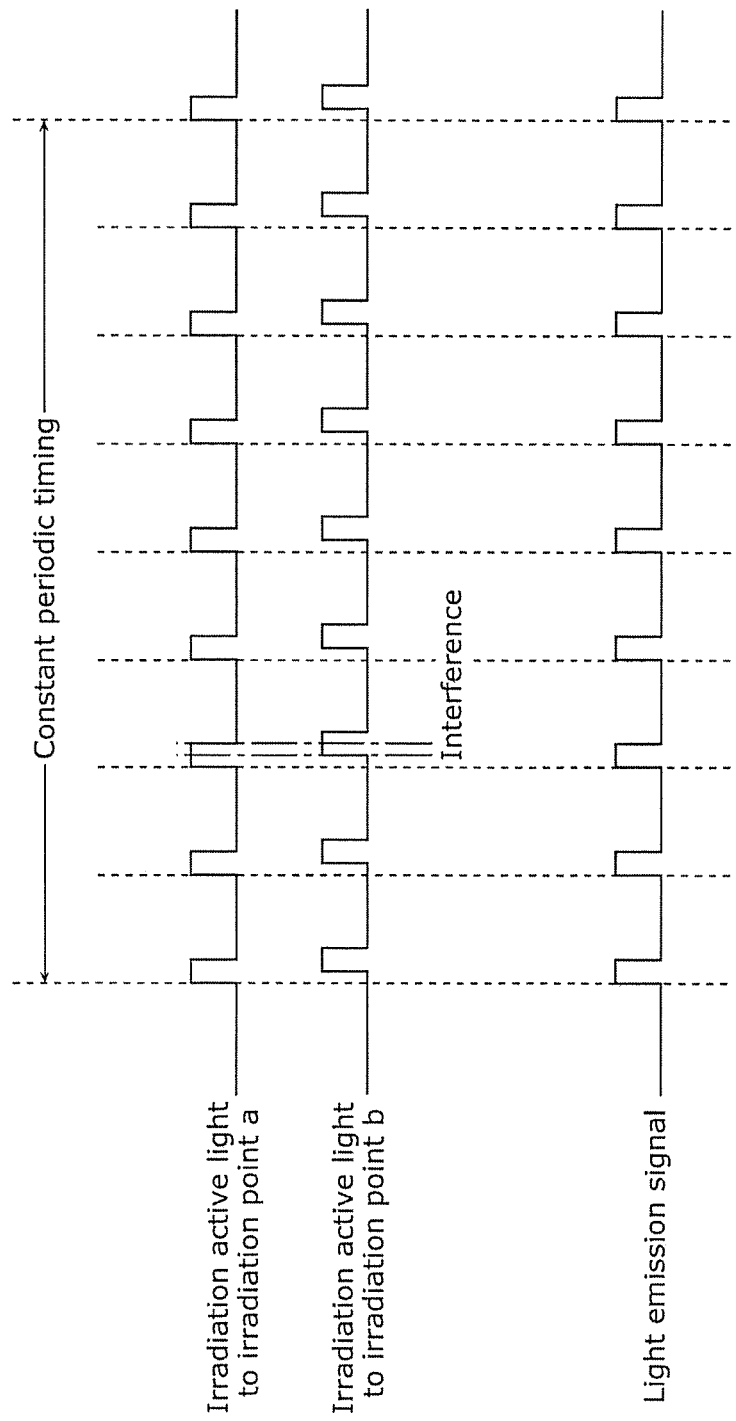
FIG. 28 is a timing chart of a light emission signal and a plurality of irradiation active light beams in a typical system.

To facilitate understanding of Modification 1 of Embodiment 6, an example of using a typical diffraction grating is described with reference to FIG. 28. FIG. 28 is a timing chart of a light emission signal and a plurality of irradiation active light beams divided by a diffraction grating 25a from pulsed light emitted in response to the light emission signal from a light source 21, in a typical system.

It should be noted that the following, as an example, are not taken into consideration to facilitate understanding of this example shown in FIG. 28: a time delay from the issue of the light emission signal to the actual light emission; and a time (a time delay) taken for the emitted light to reach a subject. Similarly, to facilitate understanding of this example, only two irradiation active light beams are shown in FIG. 28. Here, the irradiation active light beams a and b reach the corresponding irradiation points a and b in FIG. 22, FIG. 24A, or FIG. 24B.

As shown in FIG. 28, the light emission signal is issued at constant periodic timings. On this account, the light beams divided by the diffraction grating cause interference with each other and thereby cause a time lag in reaching the irradiation points. In FIG. 28, the light beams reaching the irradiation points a and b cause interference at the irradiation point b, at which a time lag from the issue of the light emission signal is caused.

The simultaneous light emissions of the irradiation active light beams a and b cause interference, meaning that one of the irradiation active light beams becomes an interfering light beams to the other. In the case of regular pulse intervals, such interference occurs for each emission of pulsed light. The time lag significantly decreases the accuracy of the measurement of the distance to the subject.

Figure 29:
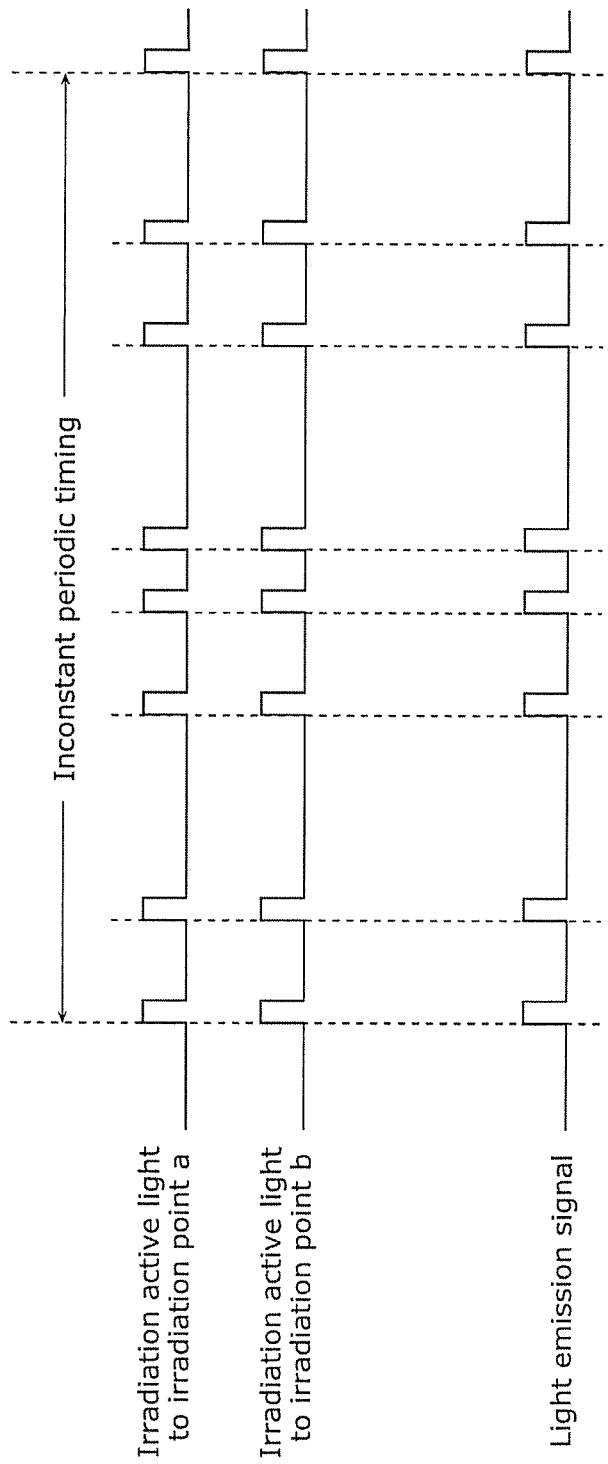
FIG. 29 is a timing chart of the light emission signal and the plurality of irradiation active light beams at inconstant periodic timings according to Embodiment 6.
Figure 30:
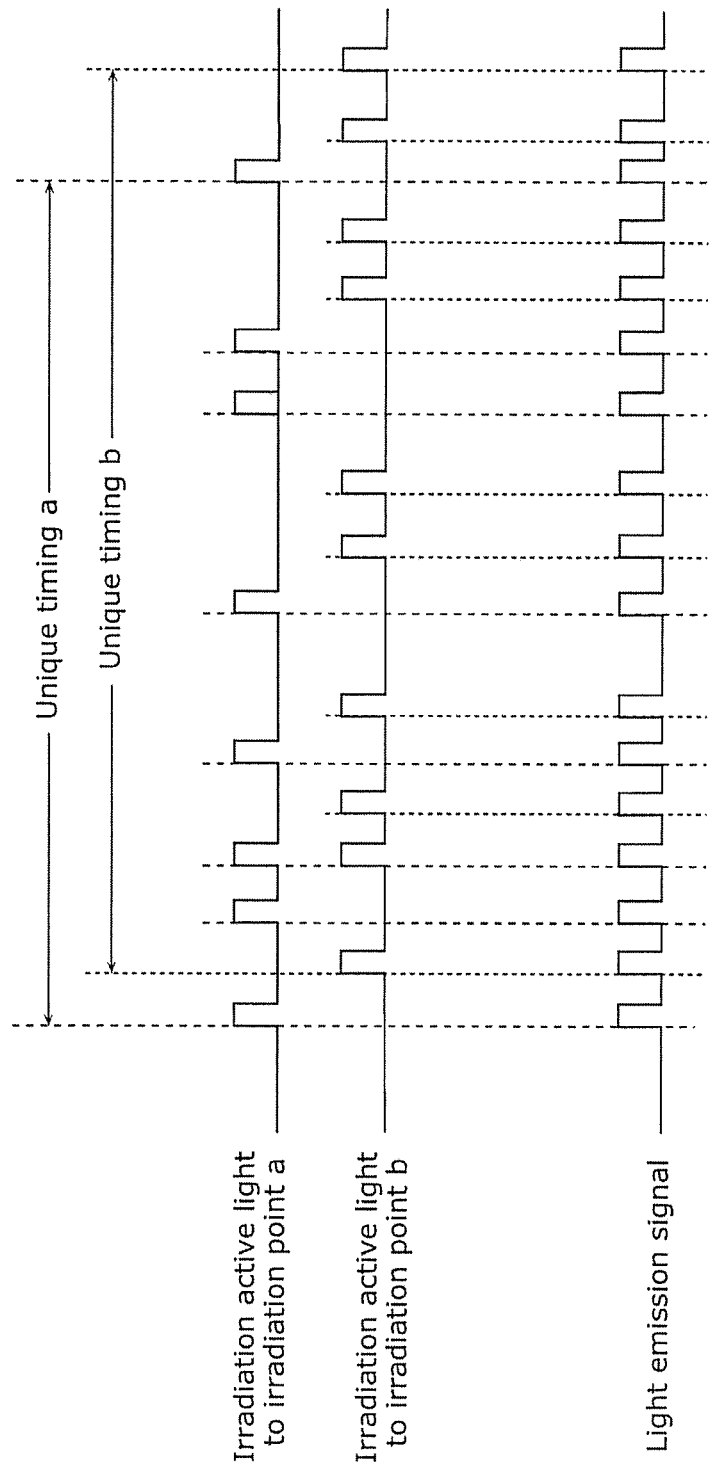
FIG. 30 is a timing chart of the light emission signal and the plurality of irradiation active light beams at unique timings according to Embodiment 6.

However, Modification 1 of Embodiment 6 can solve this problem. Details on the solution is described with reference to FIG. 29 and FIG. 30. As in the case of FIG. 28, the following, as an example, are not taken into consideration to facilitate understanding of examples shown in FIG. 29 and FIG. 30: a time delay from the issue of the light emission signal to the actual light emission; and a time (a time delay) taken for the emitted light to reach the subject. Similarly, to facilitate understanding of these examples, only two irradiation active light beams are shown in FIG. 29 and FIG. 30. Here, the irradiation active light beams a and b reach the corresponding irradiation points a and b in FIG. 22, FIG. 24A or FIG. 24B.

A first method is to issue the light emission signal at inconstant periodic timings and emit the irradiation active light beams at inconstant periodic timings, as shown in FIG. 29. By this method, interference can be reduced even when the irradiation active light beams a and b are being emitted simultaneously.

A second method is to divide the light emission signal into blocks in accordance with the divided irradiation active light beams and to emit the irradiation active light beams at individually unique timings as shown in FIG. 30. By this method, interference can be reduced more than the case shown in FIG. 28. More specifically, the unique emission timings can prevent the irradiation active light beams a and b from being emitted simultaneously and thus can further reduce interference.

As described thus far with reference to FIG. 29 and FIG. 30, the range imaging system in which the irradiation active light beams are emitted using the diffraction grating can reduce a decrease caused in the ranging accuracy by the interference between the irradiation active light beams.

Modification 2 of Embodiment 6

Figure 31:
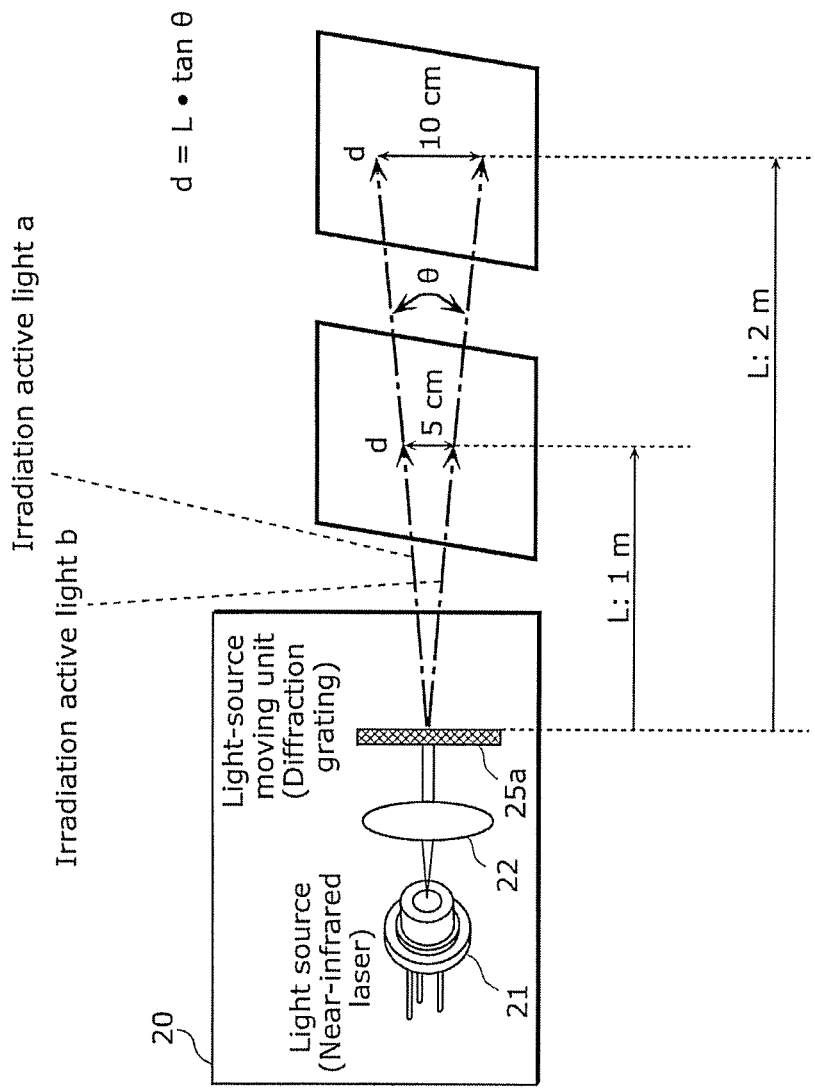
FIG. 31 is an explanatory diagram showing an example in which source light is divided into a plurality of irradiation active light beams by a diffraction grating, according to Embodiment 6.
Figure 32:
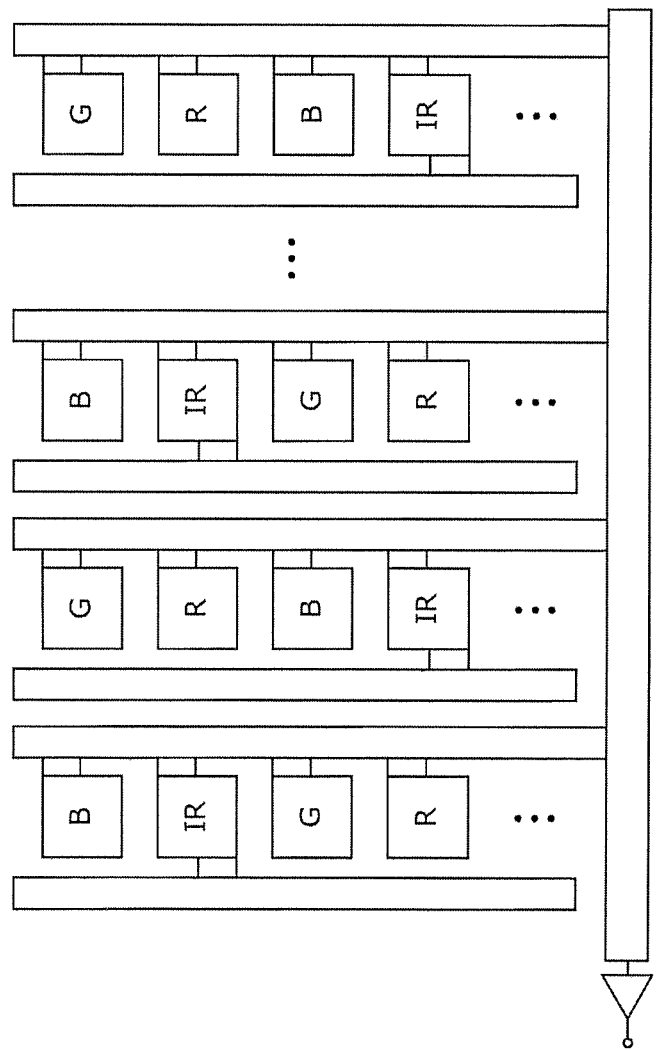
FIG. 32 is a functional block diagram showing a schematic configuration of a conventional ranging system.

FIG. 31 is an explanatory diagram showing an example in which source light from a pulsed-light source unit 20 is divided into a plurality of irradiation active light beams by a diffraction grating 25a.

As shown in FIG. 31, a distance to a subject can be measured with reference to distance data that uses the spread of the divided light beams (irradiation active light beams a and b) by the same principle in FIG. 6 to FIG. 8. In FIG. 31, the spread of the irradiation active light beams by means of the diffraction grating 25a is 5 cm of spread (dispersion) with respect to 1 m of distance to reach.

To be more specific, a distance L to the subject is calculated by Expression 2 below, where a distance between irradiation points is represented by d and the dispersion (the spread angle) of light is represented by θ.

$$d = L \cdot \tan\theta \qquad \text{Expression 2}$$

A range imaging system according to Modification 2 of Embodiment 6 can further improve the ranging accuracy by using data of, for example, the distance between the irradiation points (the distance to the subject) as a correction value for the TOF range calculation or the image range calculation (Embodiments 4 and 5).

Although some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The range imaging system according to the present disclosure can measure a distance to a subject with high accuracy, and is thus useful in ranging, for example, a person or a building.

What is claimed is:

1. A range imaging system, comprising:
a light source unit configured to emit an irradiation light beam to a subject; and
an imaging unit including a solid-state imaging device,
wherein the solid-state imaging device outputs an image capture signal for forming an image and a time-of-flight (TOF) signal of a light beam which is obtained when the irradiation light beam emitted is reflected by the subject,
the range imaging system further comprising:
a detection unit configured to detect the subject whose dimensions are to be measured from the image capture signal; and
a calculation unit configured to calculate range information from the TOF signal, the range information including the dimensions of the subject detected,
the range imaging system is mounted to portable equipment including a display unit, images the subject after the portable equipment is pointed at the subject so that the subject can be displayed on the display unit, detects the subject by the detection unit, and calculates the dimensions of the subject by the calculation unit using the TOF signal,
one of the range imaging system and the portable equipment stores the range information and the image in association with each other,
the display unit is configured to re-display the image associated with the range information and stored, and receive designation of a part of the subject by an operator after re-displaying the image stored,
the subject is scanned and imaged while the portable equipment is being moved by the operator around the subject, and
the dimensions of the subject on a side of and not in front of the portable equipment are measured.

2. The range imaging system according to claim 1,
wherein the detection unit is configured to store initial information on a specific subject, and detect the subject as the specific subject.

3. The range imaging system according to claim 1,
wherein the display unit is configured to display the image stored so that the dimensions of the subject can be checked by designating the part of the subject.

4. The range imaging system according to claim 1,
wherein the detection unit is configured to detect a plurality of the subjects.

5. The range imaging system according to claim 1,
wherein the detection unit is configured to detect a specific subject which is to be a ranging target from the image capture signal, and, based on a result of the detection, instruct a light source unit to issue a light emission instruction.

6. The range imaging system according to claim 1,
wherein the solid-state imaging device performs exposure so that an exposure period for outputting the image capture signal and an exposure period for outputting the TOF signal are not overlapped with each other.

7. The range imaging system according to claim 1,
wherein the portable equipment is a smartphone.

8. The range imaging system according to claim 1,
wherein the range information is calculated by removing an offset component by background light from the TOF signal.

9. A solid-state imaging device which is used in a range imaging system including: a light source unit which emits an irradiation light beam to a subject; and an imaging unit including a solid-state imaging device
wherein the range imaging system includes:
a detection unit configured to detect the subject whose dimensions are to be measured from an image capture signal; and
a calculation unit configured to calculate range information from a time-of-flight (TOF) signal, the range information being stored in association with an image and including the dimensions of the subject detected,
the range imaging system is mounted to portable equipment including a display unit, images the subject after the portable equipment is pointed at the subject so that the subject can be displayed on the display unit, detects the subject by the detection unit, and calculates the dimensions of the subject by the calculation unit using the TOF signal,
the range imaging system or the portable equipment stores the range information and the image in association with each other,
the display unit is configured to re-display the image associated with the range information and stored, and receive designation of a part of the subject by an operator after re-displaying the image stored,
the solid-state imaging device outputs the image capture signal for forming the image and the TOF signal of a light beam which is obtained when the irradiation light beam emitted is reflected by the subject,
the subject is scanned and imaged while the portable equipment is being moved by the operator around the subject, and
the dimensions of the subject on a side of and not in front of the portable equipment are measured.

10. A range imaging method for use in a range imaging system including: a light source unit which emits an irradiation light beam to a subject; and an imaging unit including a solid-state imaging device,
wherein the solid-state imaging device outputs an image capture signal for forming an image and a time-of-flight (TOF) signal of a light beam which is obtained when the irradiation light beam emitted is reflected by the subject, the TOF signal being obtained for each pixel and corresponding to a total sum of amounts of exposure performed several times, and
the range imaging system is mounted to portable equipment including a display unit, and further includes: a detection unit which detects the subject whose dimensions are to be measured from the image capture signal; and a calculation unit which calculates range information from the TOF signal, the range information including the dimensions of the subject detected, the range imaging method comprising:
  imaging the subject after the portable equipment is pointed at the subject so that the subject can be displayed on the display unit;
  detecting the subject whose dimensions are to be measured from the image capture signal; and
  calculating the dimensions of the subject detected using the TOF signal, wherein one of the range imaging system and the portable equipment:
  stores the range information including the dimensions of the subject and the image in association with each other;
  re-displays, on the display unit, the image associated with the range information and stored; and
  receives designation of a part of the subject by an operator after re-displaying the image stored,
wherein the subject is scanned and imaged while the portable equipment is being moved by the operator around the subject, and
the dimensions of the subject on a side of and not in front of the portable equipment are measured.

\* \* \* \* \*